J. G. PROSSER.
METHOD AND APPARATUS FOR OBTAINING WORK FROM VAPOR.
APPLICATION FILED MAY 31, 1916.
Reissued July 18, 1916.
14,168.
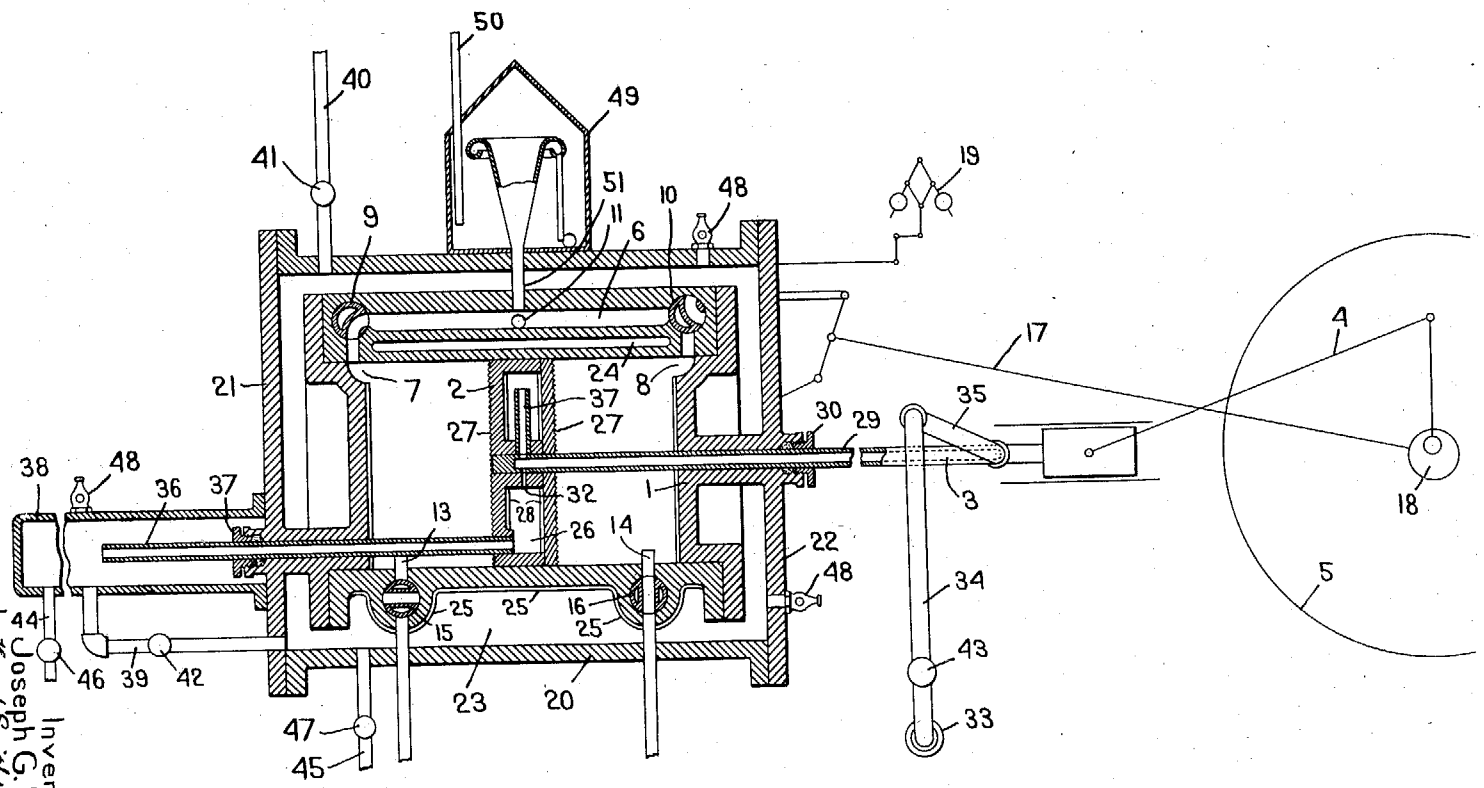
Inventor.
Joseph G. Prosser
by Heard Smith & Tennant
Attys.

UNITED STATES PATENT OFFICE.

JOSEPH G. PROSSER, OF CHICAGO, ILLINOIS.

METHOD AND APPARATUS FOR OBTAINING WORK FROM VAPOR.

14,168. Specification of Reissued Letters Patent. Reissued July 18, 1916.

Original application filed April 22, 1915, Serial No. 23,253. Original patent a continuation of application Serial No. 684,396, filed March 18, 1912. Original No. 1,165,626, dated December 28, 1915. Application for reissue filed May 31, 1916. Serial No. 100,754.

*To all whom it may concern:*

Be it known that I, JOSEPH G. PROSSER, a citizen of the United States, formerly a subject of the King of Great Britain, residing at Chicago, county of Cook, State of Illinois, have invented an Improvement in Methods and Apparatus for Obtaining Work from Vapor, of which the following description, in connection with the accompanying drawing, is a specification, like characters on the drawing representing like parts.

This invention involves a method and apparatus for obtaining work from vapor. The broad principles involved are applicable to various vapors under suitable conditions.

The invention involves in the particular form illustrated and more specifically described herein the use of steam or water vapor and the improvement or in fact the reorganization of the steam engine, whereby the efficiency of a single cylinder engine can be increased to the maximum possible in the cycle. The smaller sizes may be caused thereby to equal or exceed in efficiency the multiple cylinder engines of the present, although the principles involved can also be applied to multi-cylinder engines with advantage, especially when re-heaters are used between the cylinders.

It has from the first been realized that the amount of work obtained from the piston in a steam engine was but a comparatively small fraction of that represented by the steam admitted to the cylinder. Ever since the days of Watt continuous effort has been made to eliminate as much of this loss as possible. Various methods have been devised, used or suggested for this purpose, including the jacketing of the cylinder and even of the piston, the use of superheated steam, and other expedients familiar to the engineer and student of thermodynamics, but, owing to the failure to understand the necessity of properly correlating these and other structural characteristics affecting thermal conditions and other thermal conditions with the speed of the piston and the volume of vapor admitted, full advantage has been taken of none. Hence the determination of the design and work performance of the engine have never been the product of exact scientific principles but rather only of experiment.

The present invention provides a method for the handling of the vapor, such as steam, and an apparatus embodying the method, whereby new principles are developed and made use of and a radical saving is effected.

While the steam engine as an energy transforming device is very familiar and has been made a subject of endless investigation and discussion, yet it involves the investigation and application of thermodynamic theories abstruse in their nature and not thoroughly demonstrated. In disclosing this invention it will be impossible therefore to define with theoretical accuracy and in technical terms the principles here involved. The object will be to set forth as fully as possible the method and means by which the new results are secured. The theories propounded are for the purpose of illustrating or illuminating the disclosure, and not for the purpose of limiting or restricting. The inventor has discovered certain new principles which may be readily applied by anyone skilled in the art and by which the desired results may be secured. The basic principle thus discovered is that of the correlation between the volume of the vapor admitted to the cylinder, the structural characteristics affecting thermal conditions, the thermal conditions, and the speed of the piston to insure that the vapor at the end of the expansion shall be in a substantially saturated condition. The prevention of initial condensation is secured by this correlation and the condition of the vapor at the end of the expansion is selected as a criterion for ascertaining this condition because it is one which is readily available. With the vapor at the end of the expansion in an exact saturated condition a slight variation of the quality has no substantial effect upon the efficiency of the engine but such a variation permits a wide range of capacity. For this reason the correlation of this invention may best be defined as insuring substantially saturated vapor at the end of the expansion.

The conditions existing within the engine cylinder and the principles governing the present invention may be better understood by adopting a theory in regard to heat, although the benefits to be derived from this invention do not depend upon the truth of the theory. The theoretical propositions herein advanced are not assumed to be complete or conclusive, but are rather illustrative and explanatory. It may be assumed that heat is a mode of motion and of separation among the molecules or some portion or portions of these molecules of which matter is formed, whether it be the metal of the cylinder or the liquid, vapor or gas active therein. It may be assumed also that these molecules or molecular portions move each with respect to the other in paths which, in the case of any two molecules otherwise uninfluenced, would take the form of one of the conic sections. The molecules thus in motion tend to move radially toward each other under the gravitational attraction which exists between every two masses of whatever size. At the same time the molecules tend to separate from each other under the influence of the centrifugal force developed by the tangential action of the molecules in their orbits.

In the case of a solid it is supposed that the molecules are moving in paths, a great majority of which are elliptical, and approaching the circular, while the diameters of these orbits are small and bear possibly some proportion to the specific gravity or the density of the solids. It is supposed that in the case of liquids the space relations between the molecules have increased, their orbits become much flattened, and the speed of the molecules in their paths increased. In the case of vapors or gases it is supposed that this increase has continued to a much greater degree than in the case of liquids, resulting in far wider space relationships, in far greater speed in the molecules, and in increasing eccentricity of their orbits until the vast majority assume the form of extremely flattened ellipses or of hyperbolas. Adopting this hypothesis for purposes of illustration, the conditions controlling in a vapor engine will now be considered, and the steam engine will be considered specifically because of its familiar character and general use. The principles of the invention are readily explained in connection with the steam engine and when embodied therein work its radical improvement. But other types of engines such as turbines or engines operating with other vapors are considered within the scope of the invention, and under proper conditions may produce even better results.

Let the conditions in the cylinder be considered with the piston standing still at the exhaust end of its stroke and on the assumption that the admission and exhaust valves may be opened at will, and that the exhaust valve is connected to a condenser. Assume for example that steam is supplied to the admission at a pressure of 150 pounds absolute, and that the condenser is maintained at a uniform pressure of 4 pounds absolute. If now, with the exhaust valve closed, the admission valve be opened for a short time and again closed, the steam vapor will fill the cylinder. Assuming that the cylinder walls are composed of cast iron and have a temperature of 100° F., then the molecules of the matter in the walls will have space relations and motion due to a temperature of 100° F., while the molecules of the steam vapor will have space relations and motion due to a temperature of 358.26° F. Before, therefore, the iron and the vapor can remain in contact without any apparent change taking place in either, an equilibrium must be established between the two. The molecules of the vapor surface adjacent to the molecules of the wall surface exchange energy, the effect being to increase the space relations and amplify the orbits in the metal, and decrease the space relations and contract the orbits in the vapor. Those molecules coming closest to the metal surface would be so affected as to take the form of liquid, thus presenting the phenomenon of liquefaction. In all probability a varied exchange in heat between the vapor molecules, the liquid molecules and the iron molecules in varying combinations takes place, until finally an equilibrium is effected. The conditions under which such an equilibrium was effected would depend upon various circumstances. The iron would have to be heated all through to the same temperature as at its surface, and this would have to be the same temperature as the vapor. Hence the specific heat and the thickness of the walls and the length of time that the vapor remained in the cylinder would affect the final result. It might be necessary to fill the cylinder with vapor several times before any vapor would pass into the condenser upon opening the exhaust valve. The operation may be repeated until conditions are such that when the vapor is admitted into the cylinder a much smaller percentage of liquefaction takes place on the walls, even when time is taken to permit a practical balance throughout the system to be obtained.

Further explanation may be aided by the use of specific figures. Assuming that the cylinder contained three cubic feet and that one pound of vapor, or just enough to fill the cylinder, were admitted. If 1000 grains of moisture were found adhering to the walls of the cylinder, there would be remaining in vapor about 2000 grains to the cubic foot, but this is the weight due to steam at a little over 128 pounds absolute pressure. The cylinder would then be full of vapor at 128 pounds absolute, and the surface coated with one-seventh of a pound of water, distributed wherever any cooling took place in the vapor. If now the exhaust valve be opened and the vapor passed into the condenser, immediately the equilibrium previously established is disturbed, the condensed moisture is reëvaporated, taking heat from the iron walls, and the pressure in the cylinder is reduced to that of the condenser, assumed to be four pounds absolute. It will now be found that the walls of the cylinder are warmer than they were when the admission valve was opened to admit the steam to the cylinder. The reason for this may be made clear by continuing the use of specific figures as an illustration. When the one pound of steam was admitted at 358.26° F., 1191.2 heat units were admitted into the cylinder and on opening the exhaust, one-seventh of a pound of moisture was evaporated at a pressure slightly less than 128 pounds absolute. It may be assumed that this lesser pressure was 127 pounds absolute. This one pound of vapor passed into the condenser when the exhaust valve was open, carrying 1187.3 heat units, leaving the balance of 3.9 heat units in the cylinder walls when the moisture was evaporated.

The admission and release of the vapor may be continued and as a result the temperature of the walls would slightly rise so long as only dry vapor was admitted. The nearer the walls approach in temperature to the steam, the slower will be the gain, but eventually a temperature of the walls, fairly close to that of the incoming steam, could be obtained, although it is obvious that it never could be reached in this manner. Let it be assumed, however, that the temperature of the walls is in some way brought up to the temperature of the steam when it enters the cylinder. If now steam be admitted bringing with it into the cylinder a certain amount of water entrained or otherwise, which under ordinary conditions of saturated steam will be not less than one per cent., or in the illustrated case seventy grains, this water will probably in part at least, if not entirely, adhere to the walls of the cylinder as it strikes the walls. But this water being of the same temperature as the walls and the vapor, nothing happens until the exhaust valve to the condenser is opened. When this is done the 70 grains of water are immediately evaporated owing to the reduction in pressure and practically at the high temperature of the walls, or the evaporation takes place at a pressure slightly under 150 pounds absolute. Hence 8.6 units of heat, being the latent heat of evaporization, are extracted from the walls to evaporate this water. Thus 8.6 heat units are transferred from the cylinder walls to the contents of the cylinder upon the opening of the exhaust valve. On the next filling of the cylinder enough vapor must be liquefied on the walls to make up for the 8.6 heat units extracted, while at the same time the one per cent. or 70 more grains of water will be brought in, thus presenting 140 grains to be evaporated upon the second filling of the cylinder. This liquefaction continues to increase at each filling of the cylinder until the moisture runs off any surfaces affected and then out of the exhaust port as soon as it is opened. Thus a large amount of the heat that is absorbed from the admitted steam is retained in the wall instead of being carried out in exhaust.

The time allowed for liquefaction and for reëvaporation from the wall surfaces, and the ease with which water will drain off these surfaces are the controlling elements in fixing the quantity of steam that will pass through the cylinder. Because if the inlet valve is left open for some little time the moisture will drain off the surfaces and lie on the exhaust valve in part at least, and thus be expelled as soon as the exhaust valve is opened. The rapid molecular interchanges of energy will help to replace any heat lost by other molecules coming into propinquity with the surfaces which are now rapidly heating up. Thus, while the inlet valve is open heat is brought from outside sources throughout the whole mass of vapor to warm up the wall surfaces after these surfaces are raised to a temperature that does not necessitate liquefaction of the molecules that come into propinquity with them. But if the inlet valve is open but a short time liquefaction on the cool surfaces is the principal phenomenon before its closure, while if the exhaust valve is open for a long time all water on these surfaces will abstract heat of vaporization therefrom and thus a large quantity of vapor is carried out of the cylinder each time the exhaust opens owing to the low temperature to which the walls are reduced and the amount of liquefaction that takes place as a result. In this case no consideration has been given to any amount of heat which would be abstracted from the hot walls of the cylinder by the vapor while being exhausted.

The first principle upon which this invention is based is, therefore, this cumulative effect of any cooling action in the cylinder. Any continuing cause leading to such cooling action such, for example, as the continued admission of water carried with the vapor into the cylinder referred to in the previous example, or the action of radiation or the adiabatic expansion of the vapor, or any other cause, may in the end result in so much heat being carried out through the exhaust that any of these causes combined or alone would be so great when continued as to cover some portion of the wall surface with all the liquefaction it could retain. In other words, any one such continuing cooling effect unless checked or prevented is cumulative and is sufficient to cause all liquefaction that that portion of the wall surface affected can carry. The recognition of this principle requires that the walls must first be raised to the proper temperature and then the amount of heat abstracted from the wall surfaces in contact with the vapor must not exceed the amount supplied at the said surfaces; otherwise, the wall surfaces or any portion thereof not responding to this requirement will present a lower temperature than that of the vapor and cooling on that surface will be cumulative until the surface is loaded with all the liquefaction it can carry.

In this invention this cumulative effect of cooling in the cylinder is prevented, or controlled by superheating the admitted vapor, by eliminating moisture in any form from the admitted vapor, by transferring heat from outside sources through the body of the admitted vapor, and by jacketing the wall surfaces or supplying heat to said surfaces from outside sources, according to the particular conditions, and to an extent sufficient to prevent or control cooling at any portion.

Continuing the specific example hereinbefore stated for purposes of illustration, the cylinder may be surrounded with a steam jacket preferably at a temperature by means of which the walls of the cylinder will be heated throughout to at least the temperature of the incoming steam or in this case, 358.26°. If now the admission valve be opened and one pound of steam carrying 70 grains of moisture be admitted, the same result will occur as before, that is, the moisture will be deposited on the walls and no steam will be condensed. When, however, the exhaust is opened and the contents passed into the condenser, heat will be abstracted from the walls as before. In this case, however, the 8.6 heat units taken from the walls are immediately replaced from the jacket steam, and the walls assume the normal temperature for the next charge. If successive operations are conducted rapidly the walls may not quite recover their normal temperature, more steam will be condensed at each successive charge, tending still further to lower the wall temperature. However, through the inducing of a more rapid flow of heat through the walls, as, for example, by raising the temperature of the jacket steam to a suitable degree, the operation of filling and exhausting the cylinder can be carried on as fast as desired without cooling of the surfaces. It will thus be seen that by suitably jacketing the cylinder the cumulative cooling in the cylinder is prevented. While there will be an abstraction of heat from the jacket to prevent cooling which would otherwise occur in the cylinder, or to evaporate moisture in the steam admitted, the amount of heat thus abstracted from the jacket will not be cumulative with successive operations. Referring again to the specific example given in illustration, it will be seen that the jacket must supply the 8.6 heat units or the latent heat of vaporization of the moisture. Practically the same result would be secured in this example if 7070 grains of steam had been admitted to the cylinder, the only difference being that 1191.2 heat units entered through the admission valve and 8.6 heat units through the cylinder walls. If it were desired to pass only 1191.2 heat units through the cylinder, then 7000 grains of steam and water would be admitted, and the required heat would be absorbed from the walls and the vapor re-evaporated at practically the temperature of 358.26° F. upon the opening of the exhaust. Thus the same amount of heat may be passed through the cylinder by closing the admission valve earlier in proportion to the amount of water and abstracting any required additional heat from the jacket. The final result will be practically the same, although a small difference would exist owing to the moisture being evaporated at some pressure less than 150 pounds absolute.

Because of the question of cost it may be undesirable so to jacket the surfaces as to prevent cooling at all points, that is, there may be restricted areas of the interior surfaces to which heat cannot be supplied in sufficient quantities from outside sources to prevent cooling without so increasing the cost of the engine as to be undesirable, and again in order to secure a desired capacity it may be desirable to permit cooling over certain restricted areas of these interior surfaces, but in either case the principles of the invention are retained because the amount of cooling is under control.

In the foregoing the movement of the piston has been disregarded to simplify the consideration of cooling other than adiabatic. Likewise in now considering the matter of adiabatic cooling it will be considered separately. Neglecting therefore the effect of cooling due to other causes than adiabatic work performance, and assuming that dry saturated vapor is admitted to the cylinder, the expanding vapor moves the piston, the volume increases and the temperature of the vapor falls as the heat energy of the vapor is transformed into the movement of the piston. In such a case where the energy is developed adiabatically by the expansion of the vapor, the energy originates all throughout the body of the vapor simultaneously and is then transmitted to the particular molecules or portion of the vapor body in propinquity to the piston surface. The effect upon those molecules in immediate propinquity to the piston surface is similar to that in the case of the molecules of vapor adjacent to the wall surfaces of the cylinder already described. The space relations of the molecules adjacent to the piston surface are decreased and their orbits contracted, resulting in cooling of the vapor in contact with the piston face. But the movement of the piston continues under the continuing expansion of the vapor until the end of the stroke is reached and the cooling effect has reached its maximum. During the travel of the piston, as the temperature falls due to adiabatic work performance, cooling and partial re-heating of the vapor would continually take place, until the work done would cumulatively produce more liquefaction than could be carried, but for the fact that the interchange of heat between the piston face and the vapor and later as the temperature of the vapor falls between the vapor and the other wall surfaces prevent this cumulative cooling at the piston face being actually represented by liquefaction on the piston face.

The second principle involved in this invention is therefore that adiabatic cooling which is cumulative in its effects takes place on the face of the piston throughout the working stroke. The remedy is to supply sufficient heat to neutralize all cooling of the piston surface that may result from adiabatic action. This is preferably performed by providing a chamber in the piston to constitute a jacket and feeding vapor thereto at the required temperature. Maximum efficiency is secured by this invention when this cumulative cooling of the wall surfaces is prevented at all points, the preferred way being to admit only vapor of the highest quality available and to supply heat to the wall surfaces through the walls from outside sources, to an extent sufficient to cause the pressure acting on the piston to follow the saturated curve, whenever after cut off the vapor has reached a saturated condition. This is because consumption of vapor diminishes with increase in quality of that admitted to the cylinder and because no heat furnished during the expansion from outside sources is wasted, that portion passing to the wall surface or the working vapor being all available for maintaining the temperature of the wall surface or for work performance and the balance being available for return to the generator as when the outside source is a vapor jacket. Any lessening of these conditions decreases the efficiency. It will be apparent that the exhaust valve, the exhaust passages and parts adjacent are peculiarly subject to cooling action because they are exposed to the cooling action of the entire body of vapor discharged from the cylinder at its lowest temperature. Hence it is important that any such surfaces so exposed should be constructed to present the minimum possible area and the construction by means of the jackets or otherwise should be such as to supply from outside sources to these surfaces sufficient heat at least to neutralize the cooling effect of the exhaust vapor.

A third principle of the invention resides in providing all the walls, the surfaces of which are in contact with the working vapor, of a material and with a surface of a shape and character to secure the conduction of the required or of a maximum amount of heat to the surfaces and the transmission of the required or of a maximum amount of heat from the said surfaces to the working vapor. The application of this principle to the various surfaces in contact with the working vapor depends upon the particular conditions. The walls are by reason of the general conditions obtained divided into the three classes each subject to different conditions: (1) the piston wall; (2) the exhaust valve, the exhaust passage and parts immediately in contact with the vapor discharged from the cylinder, and (3) the remainder of the walls. The conditions acting at the piston wall are peculiar because as has been pointed out adiabatic cooling takes place at the face of the piston. It is necessary in order to secure the maximum efficiency to transmit heat from outside sources through the piston wall and from the face thereof to the working vapor. The greater the area of the surface of the piston face, the greater amount of heat may be conducted therethrough, and consequently this wall must be so shaped and finished that it will absorb on one surface the greatest amount of heat and transmit to the other surface and from it to the working vapor the greatest amount of heat in order to attain the maximum capacity. The shape of the piston face will usually be controlled by practical considerations, but the finish or character may be readily varied as, for example, by scoring the surface with grooves having side faces inclined at an angle so as to multiply the surface area. The larger this surface the more effective it should be. The material of the piston wall is also of great importance in the matter of conductivity and, according to the conditions, that material should be used which will conduct therethrough the required or maximum amount of heat. In ordinary engines copper or brass in the order named may be used and the conductivity thus more than doubled over the ordinary iron piston. The surfaces of the exhaust valve, the exhaust passage and those parts in contact with the vapor discharged from the cylinder have also peculiar requirements. Here it is necessary to have the material and the shape and character of the walls such as to conduct the required or maximum amount of heat to the surfaces so as to maintain them at a high temperature. Furthermore, at this portion of the walls it is essential that there shall be a minimum transmission of the heat from the surface to the vapor passing thereover in its passage from the cylinder. Hence, the shape and character of the wall surfaces at this area should be such as to cause the minimum transmission of heat from the surface to the vapor. This may be effected in various ways as by reducing this part of the surface as much as possible and giving it a smooth finish, and by providing it when possible with a coating which will minimize the transmission of the heat to the vapor. The surface of the exhaust valve exposed to the working vapor should be reduced to the minimum area and preferably to an area not greater than that of the exhaust port. Means should also be provided for supplying heat to this surface as far as the conditions will allow by jacketing the valve itself if possible or by other suitable means such as bringing the valve surface when the valve is open into contact with a surface to which heat is supplied from outside sources. The remainder of the walls, the surfaces of which are in contact with the working vapor should to secure the greatest capacity respond to the requirements of the piston wall, so far as constructional requirements will permit. The admission valves should also be constructed upon similar requirements to those just referred to in connection with the exhaust valve, as the admission valves are also exposed to extreme temperatures. It is also important that the construction of the engine at all points shall be such as to prevent so far as possible the retention or collection of moisture on any of the surfaces transmitting or absorbing heat, and at those points where the necessary configuration of the parts provides an opportunity for the collection or retention of moisture means should be provided for draining away any such moisture if it collects. In general, therefore, capacity will be secured by having the material, shape and finish of all the walls such as to secure the transmission of a maximum amount of heat from outside sources to the interior surfaces and by having them such as to transmit from the wall surfaces to the working vapor a maximum amount of heat, except at the exhaust surfaces where they are such as to secure the transmission of a minimum amount of heat.

The fourth principle involved is that capacity with economy is dependent upon the amount of heat supplied to the working vapor from the walls. It will be apparent that after cut off takes place the heat units available in the cylinder for work performance are (1) those stored in the walls by the admitted vapor, (2) those arising from the reduction in total heat of the working vapor as it falls from initial to terminal pressure and remains in or is brought to and remains in a saturated condition, and (3) those transferred from outside sources independently of the working vapor to the working vapor such as the cylinder and piston jackets, through the walls to the cylinder vapor. The working vapor acts chiefly as a vehicle or carrier for the heat units supplied to it from the walls and transformed into work on the piston. The heat which is abstracted from the walls by the working vapor during the working stroke is all transformed into useful work and is thus of the highest efficiency. It follows then that as much heat as possible should be transferred to the working vapor in this manner. This amount is materially increased by the increasing of the number of expansions which in turn means the increase in the range of temperature between admission and exhaust. This produces a greater drop in total heat between that of the vapor admitted and exhausted, a difference which is available for work performance; while the greater range in temperature makes the walls proportionally more efficient in transmitting heat therefrom to the working vapor. Consequently the temperature of the jackets should be as high, the number of expansions as many, and the range of temperature as large as practical requirements will allow, subject to modifications demanded by back pressure and clearance. This leads to the recognition of the next two principles.

The fifth principle is that superheat adds to the economy and the capacity of the engine with any given economy. The economy is increased because the same weight of vapor entering the cylinder brings more heat units with it. These extra units are all transformed into work without any loss taking place, thus the economy is increased because more work is done with the same weight of vapor. The capacity while maintaining any given economy is increased because with a given number of expansions the range of temperature will be increased, and thus the walls are more active in transmitting heat from the jackets to the vapor while the extra work done by heat abstracted from the vapor itself reduces the requirements from the jackets per stroke, hence the speed of the piston may be increased without causing the surfaces to become cooler.

The sixth principle of the invention is that while heat may be transferred from the admitted vapor before cut off and utilized in heating the walls, such method of supplying heat is inefficient, and while heat may be transferred from the generator through the admitted vapor before cut off to the walls, and some or all this heat may be utilized in work performance, such method of supplying heat is likely to be inefficient, because any reduction in heat if not replaced before cut off reduces the quality of the vapor which as has been shown reduces the economy and the capacity with economy also. It will thus be seen that the economy and capacity of the engine are dependent upon the volume of vapor admitted to the cylinder, the thermal conditions, the structural characteristics affecting the thermal conditions, and the speed of the piston, all of which are interdependent. The chief structural characteristics affecting the thermal conditions have been pointed out and the principles upon which they should be designed or altered to secure the desired results have been pointed out and will be further described. The thermal conditions involve the quality, that is, the temperature, pressure and weight of the vapor admitted to the cylinder and the amount of heat supplied from outside sources independently of the working vapor to the working vapor which amount depends upon the character and extent of the sources as well as upon the other thermal conditions and upon the structural characteristics of the engine affecting the thermal conditions. The establishment of this principle of interdependence of all these elements now makes it evident that a change in any of them has its effect upon the efficiency and upon the capacity of the engine. This leads to the main or seventh principle of this invention.

The seventh principle of this invention is based upon the discovery and application of a fundamental and underlying law which establishes the relation between the volume of vapor admitted to the cylinder, the structural characteristics affecting the thermal conditions, the thermal conditions and the speed of the piston by which no cooling of the working vapor except that due to work performance is secured, and thus the highest efficiency is attained. This means that what is known as initial condensation is prevented and that the vapor follows what is known as the saturation curve when after cut off it reaches saturation and is in the saturated condition at the end of the expansion. As has been pointed out, there is thus prevented a ready and fairly accurate criterion for ascertaining the existence of the desired correlation of these elements. It also appears that some variation in the quality of the vapor at the end of the expansion has comparatively little effect upon the efficiency while producing a comparatively wide range in the capacity, especially if the vapor is of a higher quality. Hence, with the correlation established the capacity may be varied considerably without a substantial effect upon the efficiency. The application of this underlying fundamental law herein for the first time set forth and which has been termed the correlation of the volume of vapor admitted to the cylinder, the structural characteristics affecting the thermal conditions, the thermal conditions and the speed of the piston results in making the design and operation of the vapor engine a scientific matter whereas heretofore it has been the result of empiricism and experiment. Such experience and the empirical rules based thereon led to the generally accepted conclusion that economy increased with speed. Hence it has never been possible, unless by some chance incapable of repetition under changed conditions, to bring actual and theoretical efficiency into coincidence. The principle of the present invention here under consideration is that there is a coöperative relation between volumes of vapor admitted, piston speed, and structural characteristics affecting thermal conditions, and thermal conditions which must be established to secure the highest or any predetermined degree of efficiency. With any of these elements given, the others must be correlated therewith; and if any is varied some or all of the others must be varied to establish or maintain this essential correlation. And it will be noted that this principle is adopted even when the efficiency is lower than that attainable. The point is that the application of this law of correlation enables the highest efficiency attainable to be predicted with accuracy and to correspond with the theoretical efficiency. It follows then that by varying one or more of the factors this efficiency may be decreased to any desired extent but the result thus obtained is reached intelligently and not by chance. So also within limits definitely established by this law of correlation efficiency may be intelligently sacrificed to any predetermined extent in order to increase the capacity.

By the application of this principle of correlation the designing of the engine becomes a matter of exact science. This principle further affords the reason for sporadic instances of high efficiency which have been heretofore attained but which could not be maintained when one or more of the factors involved were varied. For example, it has been found that with an engine running at its most economical load very little saving is effected by using a jacket, but when running with a light load the saving is considerable, while with an overload the jacket causes a loss of efficiency. In such a case this principle shows that the jacket was overworked in some part at least before the engine reached its most economical load under set conditions. While, therefore, a series of tests might have indicated the best load for any aggregation of conditions it was impossible to determine how to improve those conditions. If this principle of correlation had been applied to such a case to increase the heat transmitted from the jackets to the required extent and thus to establish the proper relation between the terminal conditions and the other elements the steam consumption would have been much reduced at the corresponding load and the jacket or the method of supplying heat to the interior surfaces from outside sources employed would have been found absolutely necessary for the attainment of this higher efficiency. It has also been demonstrated that when a high degree of superheat is used and some heat is also supplied from outside sources that three or four expansions could be obtained without material loss due to cooling of the vapor on the surfaces but with a considerable loss attending a high initial pressure. Attempts to reduce this loss by materially increasing the number of expansions have resulted in further loss instead of gain in economy because the principle of correlation herein disclosed has not been understood. So again, the importance of eliminating any moisture from the cylinder and the necessity of supplying heat to different parts of the interior surfaces to correspond with the differing requirements of those surfaces with the proper means for effecting these results have never been understood because of the lack of knowledge of the correlation of these thermal conditions and the other thermal conditions of the cylinder and the other elements which are necessary to produce the required efficiency.

Thus it has been found by experiment that an increase in the amount of moisture admitted to the cylinder means a proportionate increase in the amount of heat that is wasted, whereas upon the application of the principles of this invention it is apparent that any moisture whatever admitted to the cylinder is not only a direct loss but if continued has cumulative effect which accounts for the results heretofore secured because the correlation did not exist. It follows also that none of the means or methods hereinbefore set forth affecting any of the thermal conditions and none of the constructions devised for improving the engine in these particulars when used singly or together or in any combination can be of any value in attaining the maximum or required efficiency in the engine unless the various elements be correlated by chance.

The principles which have thus hereinbefore been set forth not only settle the main and vital features determinative of the method and apparatus but from them are readily deducible the principles which control other matters. Thus a reduction in clearance and a reduction in back pressure will each permit of an increase in the number of expansions owing to the earlier cut off with the same load in one case and the lower terminal pressure allowable in the other, and each of these will not only increase the efficiency of the engine but also the capacity with any given economy. The timing of the moving parts, the conspicuous examples of which are the admission and the exhaust valves, affects the correlation; for example, a relatively early opening of the admission valve enables more heat to be transmitted from outside sources through the vapor to the interior surfaces and a relatively early closing of the exhaust valve increases the superheating of the cushion steam.

In a well jacketed engine the cushion steam is highly superheated by compression on the return stroke of the piston and goes up rapidly in temperature under a nearly adiabatic compression. If no fresh steam were admitted it would expand along practically the same curve. The use of the cushion steam for raising the temperature of the cylinder walls does not present any direct economy in heat units because there has been a mere transference of the heat units from one side of the piston to the other. An indirect economy may, however, be effected by the increased number of expansions in the freshly admitted steam due to the more rapid fall in pressure of the highly superheated cushion steam. More than usual compression of the cushion steam may be advisable in special cases, as this compression may then be resorted to so as to warm up the interior surfaces exposed to its action just prior to admission or so as to increase the salvage with light loads.

Water or moisture in an apparatus embodying this invention need not materially affect the economy but may only serve to reduce the capacity. It will be evaporated, upon a reduction of piston speed, by the heat supplied through the jackets and will serve to advance the apparent point of cut off on the indicator card. In other words this moisture instead of being evaporated in the boiler is evaporated in the cylinder. A failure to correlate the various elements would, however, be fatal to efficiency. For this reason suitable means for eliminating moisture from the admitted steam such as a separator would materially increase the capacity without materially affecting the economy.

The main principles are thus broad and universal in their application, and details of design may be varied greatly within their scope. The small single cylinder steam engine under their application may be run with a degree of efficiency equal to or exceeding that of the multiple-cylinder engines of the present. Again, it will be observed that these principles in nearly every case increase both efficiency and capacity; that is to say, the greatest horse power per unit of content of cylinder is obtained under the same conditions that make for the maximum of efficiency when saturated or slightly superheated steam is used. Existing types and constructions of engines may be altered and regulated so as to radically improve their economy and capacity. The application of these principles to that type of engine in which the speed is maintained substantially constant requires that the other elements shall be correlated to that speed, while in that type of engine in which the piston speed varies that the other elements must be correlated to the maximum piston speed or the piston limited to a speed which when correlated with the other elements secures the desired result. When this is effected in the latter case as in the case of a locomotive engine the quality of the vapor at the end of the expansion when the speed reduces below the maximum is not reduced below saturation and the loss in efficiency is comparatively small even with some superheat in the exhausting vapor.

The ideal curve which should appear on an indicator card from an engine embodying and working under the principles herein disclosed with the steam at the point of cut off in a saturated condition and with all interior surfaces dry may be readily plotted. It is the curve known as the "saturated curve" whose abscissas are the cylinder volumes at given points and whose ordinates are the pressure absolute of the corresponding volumes when the expanding steam continues in a saturated condition. If, at the point of cut off, the vapor is superheated, the quality of the vapor will fall until the saturated condition is reached, while if the vapor is below saturated condition the quality will rise until the saturated condition is reached, and then, in either case, the ideal curve to the end of the expansion will be the saturated curve.

In the designing of an engine to comply with this invention or in the remodeling and regulating of an existing engine different methods will naturally be followed depending upon the particular conditions. Until more data has been compiled and experience gained, the actual indicator card and the weighing test must be the final criterion for deciding the economical limit of speed of the engine. This speed is not too great if the terminal pressure be found to be that due to saturated steam of a volume equal to that of the cylinder and of a weight equal to the weight of steam admitted to the cylinder after making allowances, such as for the clearance. If the terminal pressure is low from too high a speed it will be rapidly followed by the cumulative losses referred to and a consequent loss in economy, and the toe of succeeding indicator cards will show a high pressure instead of a low. If the terminal pressure is high from too low a speed it indicates superheat passing into the exhaust. This would rarely occur with any economical expansion because it would indicate that the vapor was absorbing heat more rapidly than the piston was abstracting it in work performance. The loss would then be very slight except in capacity.

Correlation, as disclosed herein, of the amount of heat contained in and supplied to the working vapor and the surfaces in contact therewith with the other elements as disclosed means control of the temperature of these surfaces; but such control is determinative of the condition or quality of the working vapor in the cylinder. By the quality of the vapor is here meant the quality of the contents of the cylinder including such moisture as may be present either in the vapor or on the surfaces. There is thus presented a tangible practical criterion for this invention because the weight, volume and pressure and consequently the quality of the working vapor is readily and accurately ascertainable. The highest efficiency in reciprocable engines will be secured by this invention when the working vapor follows the saturated curve to the end of the expansion whenever after cut off the vapor has reached a saturated condition. It is also considered that the information herein given is sufficient to enable anyone skilled in the art to test an engine and decide when the principles of this invention have been complied with. Slight departures from the theoretical perfection are of course within the scope of the invention. For example, with very hot steam in the jackets it is clear that some surfaces may be cooled at the end of the stroke, and still recover enough in temperature during exhaust to prevent the temperature of the surfaces being lowered for the next admission. In such a case the indicator card would probably show a more hollow curve than the theoretical saturated vapor pressure curve herein described and the economy would not be so good, but the cumulative cooling would nevertheless be under control. In any two engines variations in exact result are likely to occur although the conditions are apparently similar. The material and homogeneity of the walls, the area and finish of the surfaces, and the freedom with which steam fills the cylinder will all affect the results.

A specific illustration may be interesting and may serve to add to an understanding of the application of the principles of the invention. The figures used are taken from Peabody's well known tables and the conditions are such as occur in practice except that the cylinder is assumed of a size to allow ready calculation. As in the case of previous specific examples, the purpose is simply to illustrate and explain and not to limit or define the invention.

Let it be assumed that the engine cylinder has a cross sectional area of 144 square inches and is 10 feet long; that the cylinder is jacketed; that the piston is jacketed; that cut off occurs at one-tenth stroke; that saturated steam at 165 pounds absolute pressure is used, that it arrives at the point of cut off saturated and with the surface of the piston and interior surfaces of the cylinder dry; and that the back pressure is 1 pound absolute. Up to cut off there is admitted 1 cubic foot or .3635 pound of steam or $$1193.6 \times .3635 = 433.87 \text{ B. T. U.}$$

During this period work has been done in propelling the piston amounting to $$\frac{144 \times 165 \times 1}{778} = 30.5 \text{ B. T. U.}$$

The work done during the piston stroke will be that due to a mean effective pressure of close to 32% of the initial pressure. This percentage may be calculated or taken from the saturated vapor curve already described. This amounts to $$\frac{165 \times .32 \times 144 \times 10}{778} = 97.7 \text{ B. T. U.}$$

The back pressure amounts to $$\frac{1 \times 144 \times 10}{788} = 1.85 \text{ B. T. U.}$$

The terminal pressure will be that due to saturated steam which weighs $$\frac{.3635}{10} = .03635 \text{ lbs.}$$

per cubic foot or practically 14.122 pounds per square inch. There are therefore from the tables $$(q_1 + P^i) - (q_2 + P_2) = (1111 - 1077).3635 = 12.3 \text{ B. T. U.}$$

less in the steam which were converted into work through the drop in total heat without any need of evaporation taking place on the piston for this amount of work.

The heat units abstracted from the piston in evaporating adiabatic condensation are then $$97.7 - (30.5 + 12.3) = 54.9 \text{ B. T. U.}$$

The heat units returned in the feed water to the boiler at the condenser temperature of 101.99° F. are $$70 \times .3635 = 25.44 \text{ B. T. U.}$$

The total heat units chargeable to the cylinder are, therefore, $$433.87 + 54.9 - 25.44 = 463.33 \text{ B. T. U.}$$

Of these the heat units doing efficient work are $$97.7 - 1.85 = 95.85 \text{ B. T. U.}$$

The efficiency is then $$\frac{95.85}{463.33} = 20.7 = 207.9 \text{ B. T. U.}$$

per H. P. per minute or the equivalent of 10.4 pounds of steam per H. P. per hour.

Economy or capacity or both may be radically improved by observing the principles already pointed out, viz.: (*a*) by using the highest possible initial pressure and (*b*) the lowest possible back pressure, thus obtaining the maximum number of expansions and performing the minimum amount of work against back pressure; (*c*) by superheating as much as possible and thus obtaining work directly and without reëvaporation or re-heating taking place; (*d*) by constructing the walls of material of high heat conductivity with surfaces (*e*) shaped and (*f*) finished to transmit the maximum of heat; or in the case of the walls adjacent the exhaust, to transmit the minimum amount of heat; (*g*) by using the highest temperature of steam possible in the jackets; (*h*) by returning the feed water to the boiler at as high a temperature as possible; (*i*) by reducing the clearance to the minimum which mechanical conditions will permit; and (*j*) by preventing so far as possible moisture from being carried in to the cylinder with the admitted steam; (*k*) by reducing as much as possible the heat transmitted to the exhausting vapor. A moderate amount of cushioning is also an indirect help for the reasons already pointed out.

The capacity of this engine may be determined in the following manner. Assuming the use of a turned iron piston which may transmit about 300 B. T. U. per square foot per hour per degree difference in temperature, the temperature range will vary from 365.88° F. to 210° or the difference of 155.88°. A question arises as to just what portion of this difference in temperature would be available. The fall is very rapid at the start and very slow at the end; again the piston surface has a chance to recuperate during exhaust if not overcooled so it will be assumed that the total difference is available or $$155.88 \times 300 = 46764 \text{ B. T. U.}$$

that are transmitted through the surface in one hour. But it was found that 54.9 units are absorbed from the piston in each stroke of 10 feet, therefore in one hour the piston could travel $$\frac{10 \times 46764}{54.9} = 8518 \text{ feet}$$

per hour or $$\frac{9622}{60} = 142 \text{ feet}$$

per minute.

This will be a small capacity equivalent to $$\frac{165 \times .32 \times 142 \times 144}{33{,}000} = 32.7 \text{ H. P.}$$

total capacity from both sides of a smooth iron piston 144 sq. in. in area, but it will be found on investigation that each change that helps economy will also help capacity. While the true capacity has not yet been accurately determined experiments show that this figure is very conservative. A grooved iron piston or a copper piston instead of an iron piston, for example, would alone about double this capacity. When conditions are altered from present standard to conform with these requirements then the limit of speed will be set by the construction of the engine itself and the greatest capacity will be obtained under the same conditions that give the greatest economy, unless in an extreme case where superheated steam is used with a late cut off.

The data for these calculations are at present somewhat limited and an error may be made in judgment without affecting the essential principles involved. The calculations are simply illustrative. The final test must be the efficiency of the engine which should conform fairly closely to that found for the assumed conditions. Verification may be had by an actual determination of steam consumed or by the use of the indicator alone. If the expansion curve be found to correspond as described with the saturated curve described conditions cannot be far from right. And if not, corrections can then be made accordingly.

In this example the vapor was assumed to be saturated at admission. Had the cylinder at cut off contained vapor with 50° superheat, then the loss at the exhaust port would have been about 8% less, while the work done would be almost identical. Also because heat abstracted from this vapor during expansion would replace some of the units abstracted from the walls in the example given, the piston velocity, or capacity, could be proportionately increased, while the greater difference in temperature between initial and terminal pressure would again make the walls more active in transmitting heat from the jacket, thus allowing a still greater increase in velocity.

No allowance was made for any heat abstracted from other than the piston surface, so the figures obtained should give a liberal margin allowing for some variations in expansion and the effects of clearance. If the surfaces become cooler, they will be heated by the incoming steam in the manner described but this is not the preferable manner because there is almost certain to be some fall in the quality of the steam as a result with the attendant fall in efficiency also, and if this method is carried to extremes the liquefaction described takes place and the benefit of the jacket is lost.

If this method is resorted to at all, it is well to advance the lead of the inlet valve, thereby allowing molecular interchanges to replace some of the heat lost while the piston moves slowly over the dead center; for the same reason a large inlet port and free passage are desirable in order to maintain the quality of the vapor up to the point of cut off, as if it is subject to the cooling action of low temperature surfaces up to the point of cut off as well as that due to work performance on the piston, then the more of this heat that is supplied by vapor outside the cylinder, and in contact with the heat supply, the less the reduction of heat in the vapor in the cylinder and the higher its temperature when cut off occurs and for a given result a large free passage-way for the steam permits of a higher piston velocity in all cases. Similarly small clearance gives more expansions for any definite amount of work performance and it adds therefore to the efficient capacity as well as to the efficiency. In the example given clearance has been neglected but the effects of clearance and back pressure can be calculated by well known formulæ.

The single figure of drawing presented herewith illustrates mainly diagrammatically an engine cylinder and connected parts. This drawing is presented not for the purpose of disclosing any structural details, but simply to aid in a disclosure of the invention, which it will be observed is not limited to any specific form of engine or to any specific form of construction for securing the desired results. But for reasons which are apparent the engine should be capable of carrying high pressures, of running at any speed desired and the valves should be adapted for running with superheated steam and the clearance should be small to secure the best results.

Many of the structural features separately considered which are necessary to the construction of an engine embodying this invention or to the carrying out of the process of this invention are probably old, but never before have they been combined and correlated on the principles of this invention and to secure the results secured by this invention.

In the drawings the engine cylinder is indicated at 1, the piston at 2, piston rod at 3, the connecting rod at 4 and the fly wheel at 5.

The steam chest 6 is connected by the admission ports 7 and 8 with the interior of the cylinder. These ports are arranged to enter through the heads of the cylinders. The admission ports are controlled by valves 9 and 10, respectively, which may be of any suitable construction and are herein shown as of the plug type. The seats for these valves are elevated slightly above the bottom of the steam chest so that no moisture can drain from the steam chest into the valves and through the ports, and the steam chest itself is provided with a suitable drain such as shown at 11 to drain off any moisture which may collect therein.

The exhaust ports 13 and 14 are located at a sufficient distance from the end of the cylinder to allow the piston at the end of its stroke to pass over and cover these ports thus enabling a minimum clearance to be obtained and also preventing the fresh steam passing through the admission ports from coming in contact with the exhaust passages and valves until the piston has uncovered them, thus giving them considerable time to be warmed up before coming in contact with the freshly admitted steam. These exhaust ports are controlled by suitable valves 15 and 16 herein shown as of a similar type to the admission valves. It is important that all these valves shall fit snugly so as to prevent any leakage, and any suitable means may be employed for maintaining the fit and compensating for wear such as the standard expansion features which it is not necessary herein to illustrate. These four valves are all controlled by suitable valve mechanism herein indicated as operated by the rod 17 extending to the eccentric 18 and controlled by the governor 19, all in a familiar manner, to admit the steam to and exhaust it from the cylinder at each side of the piston. The governing and controlling mechanism allows any predetermined or variable degree of cut off. The entire cylinder is jacketed in the form illustrated by providing a suitable outer casing consisting of the barrel 20 and the heads 21 and 22 thus providing a space 23 around substantially the entire cylinder. The cylinder between its upper wall and the steam chest is provided with a jacketing space 24 which communicates with the space 23.

It has been found out that the surfaces of the exhaust passage and those parts in contact with the vapor discharged from the cylinder require particular attention. For the reasons set forth, the jacketed space 23 is arranged to surround so far as possible the exhaust passageway and valve and the exterior of the cylinder at this area is ribbed and grooved as shown at 25 to assist in securing transmission of heat from the jacket to the passageway and valve. The bottom of the cylinder itself is also subjected to more cooling action than the top because if any moisture is admitted to or occurs in the cylinder it will pass by gravity to the bottom and to aid in securing the transmission of the necessary amount of heat to this portion of the cylinder it may also be provided with ribs and grooves 25. The walls of the exhaust passageways between the surfaces of the cylinder and the valve may also be finished as smooth as possible and provided with a coating such as that recommended by Prof. Thurston to prevent so far as possible the transmission of the heat to the exhausting vapor. The construction thus illustrated serves also to heat, when the exhaust valve is open, the surface of the valve which when closed is exposed to the higher temperature of the admitted steam. Spaces are indicated in the body of the four valves which may be filled with air or connected to the jackets.

The piston 2 is formed to present the hollow interior 26. Its face walls should be made of suitable material as explained in order to secure the desired transmission of heat, and copper and brass are suggested for that purpose, although other suitable materials may be used. The outer surfaces of the piston are shown as provided with concentric ribs and grooves 27 and the inner surfaces with vertical ribs and grooves 28 thus increasing the area of those surfaces and their capability of heat transmission. The interior surfaces of the cylinder heads may also be as shown, provided with similar concentric ribs and grooves, thus increasing all the jacketed clearance surfaces, excepting those of the exhaust port which should be as small as possible.

It is advisable not only to supply steam to the interior of the piston but to have a little circulation through the piston, thus preventing the formation of or clearing out of air pockets. In the construction herein illustrated for securing these results the steam is admitted at the top of the hollow interior of the piston and passes out at the bottom carrying with it any air. The steam is shown as passing from the hollow interior of the piston to the cylinder jacket or the space 23.

The piston rod 3 is made hollow as shown at 29 and passes through a suitable stuffing box 30 through the jacket and cylinder end into the cylinder, and thence into the piston. A pipe 31 communicates with the interior 29 of the piston rod and extends up near to the top of the interior of the piston, and a drainage port 32 is provided to drain any moisture from the piston rod. The pipe 33 leads to the steam supply or boiler and a suitable connection is made to the hollow piston rod which in the form shown comprises two pipe sections 34 and 35 joined together and joined at their opposite ends respectively to the supply pipe 33 and the piston rod 3.

A pipe 36 extends out from the bottom of the interior of the piston and passes through a suitable stuffing box 37 in the cylinder and jacket walls. This pipe being connected to the piston interior at the bottom prevents the accumulation of any moisture in the piston and completes the circulation of the steam through the piston and the elimination of any air therefrom. The discharge through the pipe 36 may be performed in any desired manner, but as herein illustrated may be utilized as a supply to the cylinder jacket. For that purpose an elongated closed casing 38 is secured to the casing head 21 over the end of the pipe 36. A pipe connection 39 extends from the interior of the casing 38 to the jacketing space 23. The jacket space 23 is also shown as connected to a suitable source of supply by a pipe 40 entering at the top. Valves 41, 42 and 43 are provided respectively in the pipe 40 leading to the jacket space 23, in the pipe leading from the piston jacket to the jacket space 23, and in the connection from the boiler to the piston jacket. Thus, steam of different temperatures as required may be supplied to the piston jacket and the cylinder jacket or the cylinder jacket may be supplied from the piston jacket if desired, or the piston jacket may be supplied from the cylinder jacket if desired.

The engine is set preferably on a higher level than that of the water level in the boiler so that any condensation from the jackets may drain back to the boiler as through the pipes 44 and 45 provided with suitable check valves 46 and 47 respectively.

Suitable air valves 48 are provided which may be opened occasionally or thermostatic valves may be supplied.

It has been explained that it is of great importance that moisture must be eliminated from the steam admitted to the cylinder and a form of separator as one means for securing this result is illustrated at 49. Steam passes through the supply pipe 50 into the separator and from thence through the pipe 51 into the steam chest, the moisture therefrom being eliminated and drained away by the separator. The jacket spaces 24 and 23 surround the steam jacket, keeping the steam in best possible condition until it is delivered through the admission ports into the cylinder.

No attempt has been made to illustrate or describe details of construction because these will be readily understood and provided for by anyone familiar with engine construction.

It will be understood that the temperature of the surfaces in contact with the working vapor is a function of the amount of heat supplied to those surfaces and the amount of heat abstracted therefrom. The temperature of the heating agent or the heat supplied from outside sources will determine the temperature to which the surfaces can be raised, while the temperature of those surfaces during the operation of the engine will be determined by the amount of heat that the walls can transmit to them and by the amount of heat abstracted from them.

The heat supplied from outside sources independently of the working vapor is that heat which is supplied through the walls or otherwise to the vapor admitted to the cylinder, as by conduction or convection through the vapor itself, but without reducing the quality of the said vapor at any time after its admission to the cylinder. Such heat constitutes some or all of the heat supplied to the vapor admitted to the cylinder according to the efficiency desired. The source of such heat may include the same source as that of the working vapor, but when jackets are employed the working vapor is preferably not drawn through the jackets.

It is obvious that when an apparatus embodying the invention is running under a variable load the quality of vapor at the end of the expansion or the quality of vapor exhausted from the motor will necessarily vary as the load is increased or diminished. The principles of the invention will be secured in the case of such variations when the average quality of the vapor at the end of the expansion or the average quality of vapor exhausted from the motor complies with the requirements set forth in the claims.

This application is a continuation of my prior application Serial No. 684,396, filed March 18, 1912, for method and apparatus for obtaining work from vapor.

Having fully described my invention, what I claim as new and desire to secure by Letters Patent is:

1. The method of obtaining work from a vapor engine comprising a cylinder with a piston reciprocable therein, which consists in admitting vapor to the cylinder, in supplying heat from outside sources independently of the working vapor to the working vapor, and in correlating the volume of vapor admitted to the cylinder, the structural characteristics affecting thermal conditions, the thermal conditions, and the piston speed to prevent the initial cooling of the vapor entering the cylinder.

2. The method of obtaining work from a vapor engine comprising a cylinder with a piston reciprocable therein which consists in admitting vapor to the cylinder, in supplying heat from outside sources independently of the working vapor to the working vapor, and in correlating the volume of vapor admitted to the cylinder, the structural characteristics affecting thermal conditions, the thermal conditions, and the piston speed to prevent initial liquefaction.

3. The method of obtaining work from a vapor engine comprising a cylinder with a piston reciprocable therein which consists in admitting vapor to the cylinder, in supplying heat from outside sources independently of the working vapor to the working vapor, and in correlating the volume of vapor admitted to the cylinder, the structural characteristics affecting thermal conditions, the thermal conditions, and the piston speed to insure that the vapor in the cylinder shall be in a substantially saturated condition at the end of the expansion.

4. The method of obtaining work from a vapor engine comprising a cylinder with a piston reciprocable therein which consists in admitting vapor to the cylinder, in supplying heat from outside sources independently of the working vapor to the working vapor, and in correlating the volume of vapor admitted to the cylinder, the structural characteristics affecting thermal conditions, the thermal conditions, and the piston speed to insure that the vapor in the cylinder shall follow the saturated curve to the end of the expansion whenever after cut off it reaches a saturated condition.

5. The method of obtaining work from a vapor engine comprising a cylinder with a piston reciprocable therein which consists in admitting vapor to the cylinder, in supplying a predetermined amount of heat from outside sources independently of the working vapor to the working vapor, and in correlating the volume of vapor admitted to the cylinder, the structural characteristics affecting thermal conditions, the thermal conditions, and the piston speed to secure a predetermined capacity and insure the vapor being in a saturated condition at the end of the expansion.

6. The method of obtaining work from a vapor engine comprising a cylinder with a piston reciprocable therein which consists in admitting vapor to the cylinder, in supplying a predetermined amount of heat from outside sources independently of the working vapor to the working vapor from predetermined surfaces in contact with the working vapor, and in correlating the volume of vapor admitted to the cylinder, the structural characteristics affecting thermal conditions, the thermal conditions, and the piston speed to secure a predetermined capacity and insure the vapor being in a saturated condition at the end of the expansion.

7. The method of obtaining work from a vapor engine comprising a cylinder with a piston reciprocable therein which consists in admitting vapor to the cylinder, in supplying heat from outside sources independently of the working vapor to the working vapor, and in correlating the volume of vapor admitted to the cylinder, the structural characteristics affecting thermal conditions, the quality of vapor admitted to the cylinder, the other thermal conditions, and the piston speed to insure that the vapor in the cylinder shall be in a substantially saturated condition at the end of the expansion.

8. The method of obtaining work from a vapor engine comprising a cylinder with a piston reciprocable therein which consists in admitting vapor to the cylinder, in supplying a predetermined amount of heat from outside sources independently of the working vapor to the working vapor, and in correlating the volume of vapor admitted to the cylinder, the structural characteristics affecting thermal conditions, the heat so supplied, the other thermal conditions, and the piston speed to regulate the amount of heat abstracted from the working vapor.

9. The method of obtaining work from a vapor engine comprising a cylinder with a piston reciprocable therein which consists in admitting vapor to the cylinder, in supplying a predetermined amount of heat from outside sources independently of the working vapor to the working vapor from predetermined surfaces in contact with the working vapor, and in correlating the volume of vapor admitted to the cylinder, the structural characteristics affecting thermal conditions, the heat so supplied, the other thermal conditions, and the piston speed to regulate the amount of heat abstracted from the working vapor.

10. The method of obtaining work from a vapor engine comprising a cylinder with a piston reciprocable therein which consists in admitting vapor to the cylinder, in supplying heat from outside sources independently of the working vapor to the working vapor, in exhausting the main body of the vapor at alternate strokes from opposite ends of the cylinder, and in correlating the volume of vapor admitted to the cylinder, the structural characteristics affecting thermal conditions, the thermal conditions, and the piston speed to insure that the vapor in the cylinder shall be in a substantially saturated condition at the end of the expansion.

11. The method of obtaining work from a vapor engine comprising a cylinder with a piston reciprocable therein which consists in admitting vapor to the cylinder, in supplying heat from outside sources independently of the working vapor to the working vapor, in exhausting vapor at alternate strokes through separate ports at opposite sides of the center of the cylinder, in supplying heat from outside sources independently of the working vapor to the surfaces adjacent said ports which are exposed to the higher temperature of the working vapor, and in correlating the volume of vapor admitted to the cylinder, the structural characteristics affecting thermal conditions, the heat so supplied, the other thermal conditions, and the piston speed to insure that the vapor in the cylinder shall be in a substantially saturated condition at the end of the expansion.

12. The method of obtaining work from a vapor engine comprising a cylinder with a piston receptacle therein which consists in admitting vapor to the cylinder, in preventing the vapor in the cylinder from materially cooling the vapor prior to its admission to the cylinder, in exhausting vapor at alternate strokes through separate ports at opposite sides of the center of the cylinder, in supplying heat from outside sources independently of the working vapor to the surfaces adjacent said ports which are exposed to the higher temperature of the working vapor, in supplying heat from outside sources independently of the working vapor to other surfaces, and in correlating the volume of vapor admitted to the cylinder, the structural characteristics affecting thermal conditions, the heat so supplied, the other thermal conditions, and the piston speed to insure that the vapor in the cylinder shall be in a substantially saturated condition at the end of the expansion.

13. The method of obtaining work from a vapor engine comprising a cylinder with a piston reciprocable therein which consists in admitting vapor to the cylinder, in preventing the vapor in the cylinder from materially cooling the vapor prior to its admission into the cylinder, in supplying heat from outside sources independently of the working vapor to the face of the piston and to other surfaces in contact with the working vapor, in exhausting vapor at alternate strokes through separate ports at opposite sides of the center of the cylinder, and in correlating the volume of vapor admitted to the cylinder, the structural characteristics affecting thermal conditions, the heat so supplied, the other thermal conditions, and the piston speed to insure that the vapor in the cylinder shall be in a substantially saturated condition at the end of the expansion.

14. The method of obtaining work from a vapor engine comprising a cylinder with a piston reciprocable therein which consists in admitting vapor to the cylinder, in supplying heat from outside sources independently of the working vapor to the working vapor, and in limiting the piston to a speed which correlated with the volume of vapor admitted to the cylinder, the structural characteristics affecting thermal conditions, and the thermal conditions will insure that the vapor in the cylinder shall be in a substantially saturated condition at the end of the expansion.

15. The method of obtaining work from a vapor engine comprising a cylinder with a piston reciprocable therein, which consists in admitting vapor to the cylinder, in supplying heat from outside sources independently of the working vapor to the working vapor, and in limiting the piston to a speed which correlated with the volume of vapor admitted to the cylinder, the timing of the moving parts, the structural characteristics affecting thermal conditions, and the other thermal conditions will insure that the vapor in the cylinder shall be in a substantially saturated condition at the end of the expansion.

16. The method of obtaining work from a vapor engine comprising a cylinder with a piston reciprocable therein, which consists in admitting vapor to the cylinder, in supplying heat from outside sources independently of the working vapor through the cylinder and piston walls to the working vapor, and in limiting the piston to a speed which correlated with the volume of vapor admitted to the cylinder, the structural characteristics affecting thermal conditions, the heat so supplied, and the other thermal conditions, will insure that the vapor in the cylinder shall be in a substantially saturated condition at the end of the expansion.

17. The method of obtaining work from a vapor engine comprising a cylinder with a piston reciprocable therein which consists in admitting vapor to the cylinder, in supplying heat from outside sources independently of the working vapor to the surfaces adjacent the exhaust port, in supplying heat from outside sources independently of the working vapor to other surfaces in contact with the working vapor, and in limiting the piston to a speed which correlated with the volume of vapor admitted to the cylinder, the structural characteristics affecting thermal conditions, the heat so supplied, and the other thermal conditions, will insure that the vapor in the cylinder shall be in a substantially saturated condition at the end of the expansion.

18. The method of obtaining work from a vapor engine comprising a cylinder with a piston reciprocable therein, which consists in admitting vapor to the cylinder, in supplying heat from outside sources independently of the working vapor to the working vapor, and in correlating the volume of vapor admitted to the cylinder, the structural characteristics affecting thermal conditions, the thermal conditions, and the piston speed to establish and maintain, during any variation in the number of expansions demanded by the variation in the load up to the point when the terminal pressure is reduced below the exhaust pressure, such temperature of the surfaces in contact with the working vapor as are necessary to insure that the vapor in the cylinder at the end of the expansion shall be in not less than a substantially saturated condition.

19. The method of obtaining work from a vapor engine comprising a cylinder with a piston reciprocable therein, which consists in admitting vapor to the cylinder, in supplying heat from outside sources independently of the working vapor to the working vapor, and in correlating the volume of vapor admitted to the cylinder, the structural characteristics affecting thermal conditions, the thermal conditions and the piston speed to establish and maintain, during any variation in the number of expansions demanded by the variation in the load, such temperatures of the surfaces in contact with the working vapor as are necessary to insure that the vapor in the cylinder at the end of the expansion shall be in not less than a substantially saturated condition.

20. The method of obtaining work from a vapor engine comprising a cylinder with a piston reciprocable therein which consists in admitting to the cylinder vapor with sufficient superheat to permit of some expansion and of a volume which upon expansion requires the greatest amount of heat per degree difference in temperature to be transmitted from outside sources to the working vapor, in supplying heat from outside sources independently of the working vapor to the working vapor, and in correlating the volume and quality of vapor admitted to the cylinder, the structural characteristics affecting thermal conditions, the other thermal conditions, and the piston speed to insure that the vapor in the cylinder shall be in a substantially saturated condition at the end of the expansion, whereby the number of expansions may then be increased or decreased indefinitely without causing the vapor to be below a substantially saturated condition at the end of the expansion.

21. The method of obtaining work from a vapor engine comprising a cylinder with a piston reciprocable therein, which consists in admitting to the cylinder vapor with sufficient superheat to permit of some expansion and of a volume which upon expansion requires the greatest amount of heat per degree difference in temperature to be transmitted from outside sources to the working vapor, in supplying heat from outside sources independently of the working vapor to the working vapor, in exhausting the main body of the vapor at alternate strokes from opposite ends of the cylinder, and in correlating the volume and quality of vapor admitted to the cylinder, the structural characteristics affecting thermal conditions, the other thermal conditions and the piston speed to insure that the vapor in the cylinder shall be in a substantially saturated condition at the end of the expansion, whereby the number of expansions may then be increased or decreased indefinitely without causing the vapor to be below a substantially saturated condition at the end of the expansion.

22. The method of obtaining work from a vapor engine comprising a cylinder with a piston reciprocable therein, which consists in admitting vapor to the cylinder, in supplying heat from outside sources independently of the working vapor to the working vapor, and in correlating the volume of vapor admitted to the cylinder, the structural characteristics affecting thermal conditions, the thermal conditions, and the piston speed to cause more heat to be transmitted to the working vapor during the working stroke than is abstracted from or through it by the surrounding walls and to insure that the vapor shall be in a substantially saturated condition at the end of the expansion.

23. The method of obtaining work from a vapor engine comprising a cylinder with a piston reciprocable therein, which consists in admitting to the cylinder vapor in a saturated or slightly superheated condition and of such a quality as to be in a saturated condition at or before cut off, in supplying heat from outside sources independently of the working vapor to some of the surfaces in contact with the working vapor, and in correlating the volume and quality of vapor admitted to the cylinder, the structural characteristics affecting thermal conditions, the other thermal conditions, and the piston speed to insure that the vapor shall be in a substantially saturated condition at the end of the expansion whereby the correlation will be maintained regardless of any increase in the number of expansions.

24. The method of obtaining work from a vapor engine comprising a cylinder with a piston reciprocable therein which consists in admitting to the cylinder vapor in a saturated or slightly superheated condition and of such a quality as to be in a saturated condition at or before cut off, in supplying heat from outside sources independently of the working vapor to some of the surfaces in contact with the working vapor, in exhausting the main body of the vapor at alternate strokes from opposite ends of the cylinder, and in correlating the volume and quality of vapor admitted to the cylinder, the structural characteristics affecting thermal conditions, the other thermal conditions, and the piston speed to insure that the vapor shall be in a substantially saturated condition at the end of the expansion whereby the correlation will be maintained regardless of any increase in the number of expansions.

25. The method of obtaining work from a vapor engine comprising a cylinder with a piston reciprocable therein which consists in admitting vapor to the cylinder, in supplying heat from outside sources independently of the working vapor to the surfaces adjacent the exhaust which are exposed to the high temperature of the freshly admitted vapor, in supplying heat from outside sources independently of the working vapor to other surfaces in contact with the working vapor, and in correlating the volume of vapor admitted to the cylinder, the structural characteristics affecting thermal conditions, the heat so supplied, the other thermal conditions, and the piston speed to establish and maintain during the operation of the engine such temperatures of the surfaces in contact with the working vapor as are necessary to cause the vapor in the cylinder at the end of the expansion to be in not less than a substantially saturated condition.

26. The method of obtaining work from a vapor engine comprising a cylinder with a piston reciprocable therein which consists in admitting vapor to the cylinder, in supplying heat from outside sources independently of the working vapor to the surfaces of the exhaust valve which are exposed to the high temperatures of the freshly admitted vapor, in supplying heat from outside sources independently of the working vapor to other surfaces in contact with the working vapor, and in correlating the volume of vapor admitted to the cylinder, the structural characteristics affecting thermal conditions, the heat so supplied, the other thermal conditions, and the piston speed to establish and maintain during the operation of the engine such temperatures of the surfaces in contact with the working vapor as are necessary to cause the vapor in the cylinder at the end of the expansion to be in not less than a substantially saturated condition.

27. The method of obtaining work from a vapor engine comprising a cylinder with a piston reciprocable therein which consists in admitting vapor to the cylinder, in supplying heat from outside sources independently of the working vapor to the surfaces of the exhaust valve and the surfaces adjacent the exhaust which are exposed to the high temperature of the freshly admitted vapor, in supplying heat from outside sources independently of the working vapor to other surfaces in contact with the working vapor, and in correlating the volume of vapor admitted to the cylinder, the structural characteristics affecting thermal conditions, the heat so supplied, the other thermal condition, and the piston speed to establish and maintain during the operation of the engine such temperatures of the surfaces in contact with the working vapor as are necessary to cause the vapor in the cylinder at the end of the expansion to be in not less than a substantially saturated condition.

28. The method of obtaining work from a vapor engine comprising a cylinder with a piston reciprocable therein, which consists in admitting vapor to the cylinder, in supplying heat from outside sources independently of the working vapor to the surfaces adjacent the exhaust which are exposed to the high temperature of the freshly admitted vapor, in supplying heat from outside sources through the piston wall to the face thereof, in supplying heat from outside sources independently of the working vapor to other surfaces in contact with the working vapor, and in correlating the volume of vapor admitted to the cylinder, the structural characteristics affecting thermal conditions, the heat so supplied, the other thermal conditions, and the piston speed to establish and maintain during the operation of the engine such temperatures of the surfaces in contact with the working vapor as are necessary to cause the vapor in the cylinder at the end of the expansion to be in not less than a substantially saturated condition.

29. The method of obtaining work from a vapor engine comprising a cylinder with a piston reciprocable therein, which consists in admitting vapor to the cylinder, in supplying heat from outside sources through the piston wall to the face thereof, in supplying heat from outside sources independently of the working vapor to other surfaces in contact with the working vapor, and in correlating the volume of vapor admitted to the cylinder, the structural characteristics affecting thermal conditions, the heat so supplied, the other thermal conditions, and the piston speed to establish and maintain during the operation of the engine such temperatures of the surfaces in contact with the working vapor as are necessary to cause the vapor in the cylinder at the end of the expansion to be in not less than a substantially saturated condition.

30. The method of obtaining work from a vapor engine comprising a cylinder with a piston reciprocable therein, which consists in admitting vapor to the cylinder, in supplying heat from outside sources independently of the working vapor to the surfaces of the exhaust valve and the surfaces adjacent the exhaust which are exposed to the high temperature of the freshly admitted vapor, in supplying heat from outside sources independently of the working vapor to other surfaces in contact with the working vapor, and in correlating the volume of vapor admitted to the cylinder, the structural characteristics affecting thermal conditions, the heat so supplied, the other thermal conditions, and the piston speed to establish and maintain during the operation of the engine such temperatures of the surfaces in contact with the working vapor as are necessary to cause the vapor in the cylinder at the end of the expansion to be in not less than a substantially saturated condition.

31. The method of obtaining work from a vapor engine comprising a cylinder with a piston reciprocable therein, which consists in admitting vapor to the cylinder, in supplying heat from outside sources through the cylinder end walls to the faces thereof, in supplying heat from outside sources independently of the working vapor to other surfaces in contact with the working vapor, and in correlating the volume of vapor admitted to the cylinder, the structural characteristics affecting thermal conditions, the heat so supplied, the other thermal conditions, and the piston speed to establish and maintain during the operation of the engine such temperatures of the surfaces in contact with the working vapor as are necessary to cause the vapor in the cylinder at the end of the expansion to be in not less than a substantially saturated condition.

32. The method of obtaining work from a vapor engine comprising a cylinder with a piston reciprocable therein, to secure a predetermined capacity which consists in admitting vapor to the cylinder, in eliminating moisture to the extent required to secure the said capacity from the vapor admitted to the cylinder, in supplying heat from outside sources independently of the working vapor to the working vapor, and in correlating the volume and quality of vapor admitted to the cylinder, the structural characteristics affecting thermal conditions, the other thermal conditions, and the piston speed to cause the vapor in the cylinder at the end of the expansion to be in a substantially saturated condition.

33. The method of obtaining work from a vapor engine comprising a cylinder with a piston reciprocable therein, which consists in admitting vapor to the cylinder, in supplying heat from outside sources independently of the working vapor to the working vapor, in exhausting the vapor from the cylinder without bringing it into material contact with the walls exposed to the working vapor in the cylinder and thereby preventing cooling of the working vapor by the exhausted vapor, and in correlating the volume of vapor admitted to the cylinder, the structural characteristics affecting thermal conditions, the thermal conditions, and the piston speed to insure that the vapor in the cylinder shall be in a substantially saturated condition at the end of the expansion.

34. The method of obtaining work from a vapor engine comprising a cylinder with a piston reciprocable therein, which consists in admitting vapor to the cylinder, in preventing material cooling of the vapor prior to its admission into the cylinder by the vapor in the cylinder, in exhausting the vapor from the cylinder without bringing it into material contact with the walls exposed to the working vapor in the cylinder and thereby preventing cooling of the working vapor by the exhausted vapor, and in correlating the volume of vapor admitted to the cylinder, the structural characteristics affecting thermal conditions, the thermal conditions, and the piston speed to insure that the vapor in the cylinder shall be in a substantially saturated condition at the end of the expansion.

35. The method of obtaining work from a vapor engine comprising a cylinder with a piston reciprocable therein, which consists in admitting vapor to the cylinder, in supplying heat from an outside agent through the walls to some of the interior surfaces, in automatically maintaining the exterior surfaces in condition to abstract heat freely from the said agent, and in correlating the volume of vapor admitted to the cylinder, the structural characteristics affecting thermal conditions, the thermal conditions, and the piston speed to insure that the vapor in the cylinder shall be in a substantially saturated condition at the end of the expansion.

36. The method of obtaining work from a vapor engine comprising a cylinder with a piston reciprocable therein, which consists in admitting vapor to the cylinder, in supplying heat from outside sources independently of the working vapor to the working vapor, in automatically preventing the retention or collection of moisture on any of the surfaces transmitting or absorbing heat, and in correlating the volume of vapor admitted to the cylinder, the structural characteristics affecting thermal conditions, the thermal conditions, and the piston speed to insure that the vapor in the cylinder shall be in a substantially saturated condition at the end of the expansion.

37. The method of obtaining work from a vapor engine comprising a cylinder with a piston reciprocable therein, which consists in admitting vapor to the cylinder, in supplying heat from outside sources independently of the working vapor to the working vapor, in automatically preventing the retention or collection of moisture on the surfaces of the admission valve and admission passage, and in correlating the volume of vapor admitted to the cylinder, the structural characteristics affecting thermal conditions. the thermal conditions, and the piston speed to insure that the vapor in the cylinder shall be in a substantially saturated condition at the end of the expansion.

38. The method of obtaining work from a vapor engine comprising a cylinder with a piston reciprocable therein, which consists in admitting vapor to the cylinder, in supplying heat from outside sources independently of the working vapor to the working vapor, in automatically preventing the retention or collection of moisture on the surfaces of or adjacent to the exhaust valve and passage, and in correlating the volume of vapor admitted to the cylinder, the structural characteristics affecting the thermal conditions, the thermal conditions, and the piston speed to insure that the vapor in the cylinder shall be in a substantially saturated condition at the end of the expansion.

39. The method of obtaining work from a vapor motor which consists in admitting vapor to the motor, in controlling radiation and conduction from and to the vapor working in the motor, in supplying heat from outside sources to the surface of the element movable by the action of the vapor, and in correlating the volume of vapor admitted to the motor, the resistance to the movement of said element, the structural characteristics affecting thermal conditions, and the thermal conditions in the motor to bring the vapor to, and maintain it in, a substantially saturated condition during a material and predetermined period of its passage through the motor.

40. The method of obtaining work from a vapor motor which consists in admitting superheated vapor to the motor, in controlling radiation and conduction from and to the vapor working in the motor, in supplying heat from outside sources to the surface of the element movable by the action of the vapor, and in correlating the volume and quality of vapor admitted to the motor, the resistance to the movement of said element, the structural characteristics affecting thermal conditions, and the other thermal conditions in the motor to cause the vapor after it reaches the saturated condition to be maintained in such condition during a predetermined amount of expansion.

41. The method of obtaining work from a vapor motor which consists in admitting vapor to the motor, in controlling radiation and conduction from and to the vapor working in the motor, in supplying heat from outside sources to the surface of the element movable by the action of the vapor, and in correlating the volume of vapor admitted to the motor, the speed of the said element, the structural characteristics affecting thermal conditions, and the thermal conditions in the motor to bring the vapor to, and maintain it in, a substantially saturated condition during a material and predetermined period of its passage through the motor.

42. The method of obtaining work from a vapor motor which consists in admitting superheated vapor to the motor, in controlling radiation and conduction from and to the vapor working in the motor, in supplying heat from outside sources to the surface of the element movable by the action of the vapor, and in correlating the volume and quality of vapor admitted to the motor, the structural characteristics affecting thermal conditions, the other thermal conditions, and the speed of said element to cause the vapor after it reaches the saturated condition to be maintained in such condition during a predetermined amount of expansion.

43. The method of obtaining work from a vapor motor which consists in admitting vapor to the motor, in controlling radiation and conduction from and to the vapor working in the motor, in supplying heat from outside sources to the surface of the element movable by the action of the vapor, and in correlating the volume of vapor admitted to the motor, the resistance to the movement of said element, the structural characteristics affecting thermal conditions, and the thermal conditions in the motor to regulate the amount of heat abstracted from the working vapor.

44. The method of obtaining work from a vapor engine comprising a cylinder with a piston reciprocable therein, which consists in admitting vapor to the cylinder, in supplying heat from outside sources independently of the working vapor to the working vapor, and in correlating the volume of vapor admitted to the cylinder, the volume of clearance space, the other structural characteristics affecting thermal conditions, the thermal conditions in the cylinder, and the piston speed to insure that the vapor in the cylinder shall be in a substantially saturated condition at the end of the expansion.

45. The method of obtaining work from a vapor engine comprising a cylinder with a piston reciprocable therein, which consists in supplying vapor to the cylinder, in supplying heat to some of the interior surfaces through the walls, and in maintaining the thermal conditions of a character to insure that the vapor at the end of the expansion shall be in not less than a substantially saturated condition.

46. The method of obtaining work from a vapor engine comprising a cylinder with a piston reciprocable therein, which consists in admitting vapor to the cylinder, in supplying heat from outside sources independently of the working vapor to the working vapor, and in correlating the volume of vapor admitted to the cylinder, the structural characteristics affecting thermal conditions, the thermal conditions, and the resistance to the movement of the piston to maintain the thermal conditions of a character to insure that the vapor at the end of the expansion shall be in a substantially saturated condition.

47. A vapor engine comprising a cylinder, a piston reciprocable therein, means for admitting vapor to the cylinder, means for supplying heat from outside sources independently of the working vapor to the working vapor, and means acting to correlate the volume of vapor admitted to the cylinder, the structural characteristics affecting thermal conditions, the thermal conditions and the piston speed to prevent the initial cooling of the vapor entering the cylinder.

48. A vapor engine comprising a cylinder, a piston reciprocable therein, means for admitting vapor to the cylinder, means for supplying heat from outside sources independently of the working vapor to the working vapor, and means acting to correlate the volume of vapor admitted to the cylinder, the structural characteristics affecting thermal conditions, the thermal conditions, and the piston speed to prevent initial liquefaction.

49. A vapor engine comprising a cylinder, a piston reciprocable therein, means for admitting vapor to the cylinder, means for supplying heat from outside sources independently of the working vapor to the working vapor, and means acting to correlate the volume of vapor admitted to the cylinder, the structural characteristics affecting thermal conditions, the thermal conditions, and the piston speed to insure that the vapor in the cylinder shall be in a substantially saturated condition at the end of the expansion.

50. A vapor engine comprising a cylinder, a piston reciprocable therein, means for admitting vapor to the cylinder, means for supplying heat from outside sources independently of the working vapor to the working vapor, and means acting to correlate the volume of vapor admitted to the cylinder, the structural characteristics affecting thermal conditions, the thermal conditions, and the piston speed to insure that the vapor in the cylinder shall follow the saturated curve to the end of the expansion whenever after cut off it reaches a saturated condition.

51. A vapor engine comprising a cylinder, a piston reciprocable therein, means for admitting vapor to the cylinder, means for supplying a predetermined amount of heat from outside sources independently of the working vapor to the working vapor, and means acting to correlate the volume of vapor admitted to the cylinder, the structural characteristics affecting thermal conditions, the thermal conditions and the piston speed to secure a predetermined capacity and insure the vapor being in a saturated condition at the end of the expansion.

52. A vapor engine comprising a cylinder, a piston reciprocable therein, means for admitting vapor to the cylinder, means for supplying a predetermined amount of heat from outside sources independently of the working vapor to the working vapor from predetermined surfaces in contact with the working vapor, and means acting to correlate the volume of vapor admitted to the cylinder, the structural characteristics affecting thermal conditions, the thermal conditions, and the piston speed to secure a predetermined capacity and insure the vapor being in a saturated condition at the end of the expansion.

53. A vapor engine comprising a cylinder, a piston reciprocable therein, means for admitting vapor to the cylinder, means for supplying heat from outside sources independently of the working vapor to the working vapor, and means acting to correlate the volume of vapor admitted to the cylinder, the structural characteristics affecting thermal conditions, the quality of vapor admitted to the cylinder, the other thermal conditions, and the piston speed to insure that the vapor in the cylinder shall be in a substantially saturated condition at the end of the expansion.

54. A vapor engine comprising a cylinder, a piston reciprocable therein, means for admitting vapor to the cylinder, means for supplying a predetermined amount of heat from outside sources independently of the working vapor to the working vapor, and means acting to correlate the volume of vapor admitted to the cylinder, the structural characteristics affecting thermal conditions, the heat so supplied, the other thermal conditions, and the piston speed to regulate the amount of heat abstracted from the working vapor.

55. A vapor engine comprising a cylinder, a piston reciprocable therein, means for admitting vapor to the cylinder, means for supplying a predetermined amount of heat from outside sources independently of the working vapor to the working vapor from predetermined surfaces in contact with the working vapor, and means acting to correlate the volume of vapor admitted to the cylinder, the structural characteristics affecting thermal conditions, the heat so supplied, the other thermal conditions, and the piston speed to regulate the amount of heat abstracted from the working vapor.

56. A vapor engine comprising a cylinder, a piston reciprocable therein, means for admitting vapor to the cylinder, means for supplying heat from outside sources independently of the working vapor to the working vapor, means for exhausting the main body of the vapor at alternate strokes from opposite ends of the cylinder, and means acting to correlate the volume of vapor admitted to the cylinder, the structural characteristics affecting thermal conditions, the thermal conditions, and the piston speed to insure that the vapor in the cylinder shall be in a substantially saturated condition at the end of the expansion.

57. A vapor engine comprising a cylinder, a piston reciprocable therein, separate exhaust ports at opposite sides of the center of the cylinder, means for admitting vapor to the cylinder, means for supplying heat from outside sources independently of the working vapor to the working vapor, means for exhausting vapor at alternate strokes through the said ports, means for supplying heat from outside sources independently of the working vapor to the surfaces adjacent said ports which are exposed to the higher temperature of the working vapor, and means acting to correlate the volume of vapor admitted to the cylinder, the structural characteristics affecting thermal conditions, the heat so supplied, the other thermal conditions, and the piston speed to insure that the vapor in the cylinder shall be in a substantially saturated condition at the end of the expansion.

58. A vapor engine comprising a cylinder, a piston reciprocable therein, means for admitting vapor to the cylinder, means for preventing the vapor in the cylinder from materially cooling the vapor prior to its admission into the cylinder, means for exhausting vapor at alternate strokes through separate ports at opposite sides of the center of the cylinder, means for supplying heat from outside sources independently of the working vapor to the surfaces adjacent said ports which are exposed to the higher temperature of the working vapor, means for supplying heat from outside sources independently of the working vapor to other surfaces, and means acting to correlate the volume of vapor admitted to the cylinder, the structural characteristics affecting thermal conditions, the heat so supplied, the other thermal conditions, and the piston speed to insure that the vapor in the cylinder shall be in a substantially saturated condition at the end of the expansion.

59. A vapor engine comprising a cylinder, a piston reciprocable therein, exhaust ports at opposite sides of the center of the cylinder, means for admitting vapor to the cylinder, means for preventing the vapor in the cylinder from materially cooling the vapor prior to its admission into the cylinder, means for supplying heat from outside sources independently of the working vapor to the face of the piston and to other surfaces in contact with the working vapor, means for exhausting vapor at alternate strokes through said ports and means acting to correlate the volume of vapor admitted to the cylinder, the structural characteristics affecting thermal conditions, the heat so supplied, the other thermal conditions, and the piston speed to insure that the vapor in the cylinder shall be in a substantially saturated condition at the end of the expansion.

60. A vapor engine comprising a cylinder, a piston reciprocable therein, means for admitting vapor to the cylinder, means for supplying heat from outside sources independently of the working vapor to the working vapor, means for limiting the piston to a speed which correlated with the volume of vapor admitted to the cylinder, the structural characteristics affecting thermal conditions, and the thermal conditions will insure that the vapor in the cylinder shall be in a substantially saturated condition at the end of the expansion.

61. A vapor engine comprising a cylinder, a piston reciprocable therein, means for admitting vapor to the cylinder, means for supplying heat from outside sources independently of the working vapor to the working vapor, means for limiting the piston to a speed which correlated with the volume of vapor admitted to the cylinder, the timing of the moving parts, the structural characteristics affecting thermal conditions, and the other thermal conditions will insure that the vapor in the cylinder shall be in a substantially saturated condition at the end of the expansion.

62. A vapor engine comprising a cylinder, a piston reciprocable therein, means for admitting vapor to the cylinder, means for supplying heat from outside sources independently of the working vapor through the cylinder and piston walls to the working vapor, and means for limiting the piston to a speed which correlated with the volume of vapor admitted to the cylinder, the structural characteristics affecting thermal conditions, the heat so supplied, and the other thermal conditions, will insure that the vapor in the cylinder shall be in a substantially saturated condition at the end of the expansion.

63. A vapor engine comprising a cylinder, a piston reciprocable therein, means for admitting vapor to the cylinder, means for supplying heat from outside sources independently of the working vapor to the surfaces adjacent the exhaust port, means for supplying heat from outside sources independently of the working vapor to other surfaces in contact with the working vapor, and means for limiting the piston to a speed which correlated with the volume of vapor admitted to the cylinder, the structural characteristics affecting thermal conditions, the heat so supplied, and the other thermal conditions, will insure that the vapor in the cylinder shall be in a substantially saturated condition at the end of the expansion.

64. A vapor engine comprising a cylinder, a piston reciprocable therein, means for admitting vapor to the cylinder, means for supplying heat from outside sources independently of the working vapor to the working vapor, and means acting to correlate the volume of vapor admitted to the cylinder, the structural characteristics affecting thermal conditions, the thermal conditions, and the piston speed to establish and maintain, during any variation in the number of expansions demanded by the variation in the load up to the point when the thermal pressure is reduced below the exhaust pressure, such temperature of the surfaces in contact with the working vapor as are necessary to insure that the vapor in the cylinder at the end of the expansion shall be in not less than a substantially saturated condition.

65. A vapor engine comprising a cylinder, a piston reciprocable therein, means for admitting vapor to the cylinder, means for supplying heat from outside sources independently of the working vapor to the working vapor, and means acting to correlate the volume of vapor admitted to the cylinder, the structural characteristics affecting thermal conditions, the thermal conditions and the piston speed to establish and maintain, during any variation in the number of expansions demanded by the variation in the load, such temperatures of the surfaces in contact with the working vapor as are necessary to insure that the vapor in the cylinder at the end of the expansion shall be in not less than a substantially saturated condition.

66. A vapor engine comprising a cylinder, a piston reciprocable therein, means for causing the admission to the cylinder of vapor with sufficient superheat to permit of some expansion and of a volume which upon expansion requires the greatest amount of heat per degree difference in temperature to be transmitted from outside sources to the working vapor, means for supplying heat from outside sources independently of the working vapor to the working vapor, and means acting to correlate the volume and quality of vapor admitted to the cylinder, the structural characteristics affecting thermal conditions, the other thermal conditions, and the piston speed to insure that the vapor in the cylinder shall be in a substantially saturated condition at the end of the expansion, whereby the number of expansions may then be increased or decreased indefinitely without causing the vapor to be below a substantially saturated condition at the end of the expansion.

67. A vapor engine comprising a cylinder, a piston reciprocable therein, means for causing the admission to the cylinder of vapor with sufficient superheat to permit of some expansion and of a volume which upon expansion requires the greatest amount of heat per degree difference in temperature to be transmitted from outside sources to the working vapor, means for supplying heat from outside sources independently of the working vapor to the working vapor, means for causing the main body of the vapor to be exhausted at alternate strokes from opposite ends of the cylinder, and means acting to correlate the volume and quality of vapor admitted to the cylinder, the structural characteristics affecting thermal conditions, the other thermal conditions and the piston speed to insure that the vapor in the cylinder shall be in a substantially saturated condition at the end of the expansion, whereby the number of expansions may then be increased or decreased indefinitely without causing the vapor to be below a substantially saturated condition at the end of the expansion.

68. A vapor engine comprising a cylinder, a piston reciprocable therein, means for admitting vapor to the cylinder, means for supplying heat from outside sources independently of the working vapor to the working vapor, and means acting to correlate the volume of vapor admitted to the cylinder, the structural characteristics affecting thermal conditions, the thermal conditions, and the piston speed to cause more heat to be transmitted to the working vapor during the working stroke than is abstracted from or through it by the surrounding walls and to insure that the vapor shall be in a substantially saturated condition at the end of the expansion.

69. A vapor engine comprising a cylinder, a piston reciprocable therein, means for causing the admission to the cylinder of vapor in a saturated or slightly superheated condition and of such a quality as to be in a saturated condition at or before cut off, means for supplying heat from outside sources independently of the working vapor to some of the surfaces in contact with the working vapor, and means acting to correlate the volume and quality of vapor admitted to the cylinder, the structural characteristics affecting thermal conditions, the other thermal conditions, and the piston speed to insure that the vapor shall be in a substantially saturated condition at the end of the expansion whereby the correlation will be maintained regardless of any increase in the number of expansions.

70. A vapor engine comprising a cylinder, a piston reciprocable therein, means for causing the admission to the cylinder of vapor in a saturated or slightly superheated condition and of such a quality as to be in a saturated condition at or before cut off, means for supplying heat from outside sources independently of the working vapor to some of the surfaces in contact with the working vapor, means for causing the main body of the vapor to be exhausted at alternate strokes from opposite ends of the cylinder, and means acting to correlate the volume and quality of vapor admitted to the cylinder, the structural characteristics affecting thermal conditions, the other thermal conditions, and the piston speed to insure that the vapor shall be in a substantially saturated condition at the end of the expansion whereby the correlation will be maintained regardless of any increase in the number of expansions.

71. A vapor engine comprising a cylinder, a piston reciprocable therein, means for admitting vapor to the cylinder, means for supplying heat from outside sources independently of the working vapor to the surfaces adjacent the exhaust which are exposed to the high temperature of the freshly admitted vapor, means for supplying heat from outside sources independently of the working vapor to other surfaces in contact with the working vapor, and means acting to correlate the volume of vapor admitted to the cylinder, the structural characteristics affecting thermal conditions, the heat so supplied, the other thermal conditions, and the piston speed to establish and maintain during the operation of the engine such temperatures of the surfaces in contact with the working vapor as are necessary to cause the vapor in the cylinder at the end of the expansion to be in not less than a substantially saturated condition.

72. A vapor engine comprising a cylinder, a piston reciprocable therein, means for admitting vapor to the cylinder, means for supplying heat from outside sources independently of the working vapor to the surfaces of the exhaust valve which are exposed to the high temperature of the freshly admitted vapor, means for supplying heat from outside sources independently of the working vapor to other surfaces in contact with the working vapor, and means acting to correlate the volume of vapor admitted to the cylinder, the structural characteristics affecting thermal conditions, the heat so supplied, the other thermal conditions, and the piston speed to establish and maintain during the operation of the engine such temperatures of the surfaces in contact with the working vapor as are necessary to cause the vapor in the cylinder at the end of the expansion to be in not less than a substantially saturated condition.

73. A vapor engine comprising a cylinder, a piston reciprocable therein, an exhaust valve, means for admitting vapor to the cylinder, means for supplying heat from outside sources independently of the working vapor to the surfaces of the exhaust valve and the surfaces adjacent the exhaust which are exposed to the high temperature of the freshly admitted vapor, means for supplying heat from outside sources independently of the working vapor to other surfaces in contact with the working vapor, and means acting to correlate the volume of vapor admitted to the cylinder, the structural characteristics affecting thermal conditions, the heat so supplied, the other thermal conditions, and the piston speed to establish and maintain during the operation of the engine such temperatures of the surfaces in contact with the working vapor as are necessary to cause the vapor in the cylinder at the end of the expansion to be in not less than a substantially saturated condition.

74. A vapor engine comprising a cylinder, a piston reciprocable therein, an exhaust passage, an exhaust valve, means for admitting vapor to the cylinder, means for supplying heat from outside sources independently of the working vapor to the surfaces of the exhaust passage and adjacent thereto which are exposed to the high temperature of the freshly admitted vapor, means for supplying heat from outside sources through the piston wall to the face thereof, means for supplying heat from outside sources independently of the working vapor to other surfaces in contact with the working vapor, and means acting to correlate the volume of vapor admitted to the cylinder, the structural characteristics affecting thermal conditions, the heat so supplied, the other thermal conditions, and the piston speed to establish and maintain during the operation of the engine such temperatures of the surfaces in contact with the working vapor as are necessary to cause the vapor in the cylinder at the end of the expansion to be in not less than a substantially saturated condition.

75. A vapor engine comprising a cylinder, a piston reciprocable therein, means for admitting vapor to the cylinder, means for supplying heat from outside sources through the piston wall to the face thereof, means for supplying heat from outside sources independently of the working vapor to other surfaces in contact with the working vapor, and means acting to correlate the volume of vapor admitted to the cylinder, the structural characteristics affecting thermal conditions, the heat so supplied, the other thermal conditions, and the piston speed to establish and maintain during the operation of the engine such temperatures of the surfaces in contact with the working vapor as are necessary to cause the vapor in the cylinder at the end of the expansion to be in not less than a substantially saturated condition.

76. A vapor engine comprising a cylinder, a piston reciprocable therein, an exhaust passage, an exhaust valve therefor, means for admitting vapor to the cylinder, means for supplying heat from outside sources independently of the working vapor to the surfaces of the exhaust valve of the exhaust passage and the surfaces adjacent thereto which are exposed to the high temperature of the freshly admitted vapor, means for supplying heat from outside sources independently of the working vapor to other surfaces in contact with the working vapor, and means acting to correlate the volume of vapor admitted to the cylinder, the structural characteristics affecting thermal conditions, the heat so supplied, the other thermal conditions, and the piston speed to establish and maintain during the operation of the engine such temperatures of the surfaces in contact with the working vapor as are necessary to cause the vapor in the cylinder at the end of the expansion to be in not less than a substantially saturated condition.

77. A vapor engine comprising a cylinder, a piston reciprocable therein, means for admitting vapor to the cylinder, means for supplying heat from outside sources through the cylinder end walls to the faces thereof, means for supplying heat from outside sources independently of the working vapor to other surfaces in contact with the working vapor, and means acting to correlate the volume of vapor admitted to the cylinder, the structural characteristics affecting thermal conditions, the heat so supplied, the other thermal conditions, and the piston speed to establish and maintain during the operation of the engine such temperatures of the surfaces in contact with the working vapor as are necessary to cause the vapor in the cylinder at the end of the expansion to be in not less than a substantially saturated condition.

78. A vapor engine comprising a cylinder, a piston reciprocable therein, means for admitting vapor to the cylinder, means for eliminating moisture from the vapor admitted to the cylinder to the extent required to secure a predetermined capacity, means for supplying heat from outside sources independently of the working vapor to the working vapor, and means acting to correlate the volume and quality of vapor admitted to the cylinder, the structural characteristics affecting thermal conditions, the other thermal conditions, and the piston speed to cause the vapor in the cylinder at the end of the expansion to be in a substantially saturated condition.

79. A vapor engine comprising a cylinder, a piston reciprocable therein, means for admitting vapor to the cylinder, means for supplying heat from outside sources independently of the working vapor to the working vapor, means for causing the vapor to be exhausted from the cylinder without bringing it into material contact with the walls exposed to the working vapor in the cylinder and thereby preventing cooling of the working vapor by the exhausted vapor, and means acting to correlate the volume of vapor admitted to the cylinder, the structural characteristics affecting thermal conditions, the thermal conditions, and the piston speed to insure that the vapor in the cylinder shall be in a substantially saturated condition at the end of the expansion.

80. A vapor engine comprising a cylinder, a piston reciprocable therein, means for admitting vapor to the cylinder, means for preventing material cooling of the vapor prior to its admission into the cylinder by the vapor in the cylinder, means for causing the vapor to be exhausted from the cylinder without bringing it into material contact with the walls exposed to the working vapor in the cylinder and thereby preventing cooling of the working vapor by the exhausted vapor, and means acting to correlate the volume of vapor admitted to the cylinder, the structural characteristics affecting thermal conditions, the thermal conditions, and the piston speed to insure that the vapor in the cylinder shall be in a substantially saturated condition at the end of the expansion.

81. A vapor engine comprising a cylinder, a piston reciprocable therein, means for admitting vapor to the cylinder, means for supplying heat from an outside agent through the walls to some of the interior surfaces, means for automatically maintaining the exterior surfaces in condition to abstract heat freely from the said agent, and means acting to correlate the volume of vapor admitted to the cylinder, the structural characteristics affecting thermal conditions, the thermal conditions, and the piston speed to insure that the vapor in the cylinder shall be in a substantially saturated condition at the end of the expansion.

82. A vapor engine comprising a cylinder, a piston reciprocable therein, means for admitting vapor to the cylinder, means for supplying heat from outside sources independently of the working vapor to the working vapor, means for automatically preventing the retention or collection of moisture on any of the surfaces transmitting or absorbing heat, and means acting to correlate the volume of vapor admitted to the cylinder, the structural characteristics affecting thermal conditions, the thermal conditions, and the piston speed to insure that the vapor in the cylinder shall be in a substantially saturated condition at the end of the expansion.

83. A vapor engine comprising a cylinder, a piston reciprocable therein, means for admitting vapor to the cylinder, means for supplying heat from outside sources independently of the working vapor to the working vapor, means for automatically preventing the retention or collection of moisture on the surfaces of the admission valve and admission passage, and means acting to correlate the volume of vapor admitted to the cylinder, the structural characteristics affecting thermal conditions, the thermal conditions, and the piston speed to insure that the vapor in the cylinder shall be in a substantially saturated condition at the end of the expansion.

84. A vapor engine comprising a cylinder, a piston reciprocable therein, means for admitting vapor to the cylinder, means for supplying heat from outside sources independently of the working vapor to the working vapor, means for automatically preventing the retention or collection of moisture on the surfaces of the exhaust valve and passage, and means acting to correlate the volume of vapor admitted to the cylinder, the structural characteristics affecting thermal conditions, the thermal conditions, and the piston speed to insure that the vapor in the cylinder shall be in a substantially saturated condition at the end of the expansion.

85. A vapor motor comprising an element movable by the action of the vapor, means for admitting vapor to the motor, means for controlling radiation and conduction from and to the vapor working in the motor, means for supplying heat from outside sources to the surface of the said element, and means acting to correlate the volume of vapor admitted to the motor, the resistance to the movement of said element, the structural characteristics affecting thermal conditions, and the thermal conditions in the motor to bring the vapor to, and maintain it in, a substantially saturated condition during a material and predetermined period of its passage through the motor.

86. A vapor motor comprising an element movable by the action of the vapor, means for causing the admission of superheated vapor to the motor, means for controlling radiation and conduction from and to the vapor working in the motor, means for supplying heat from outside sources to the surfaces of the said element, and means acting to correlate the volume and quality of vapor admitted to the motor, the resistance to the movement of said element, the structural characteristics affecting thermal conditions, and the thermal conditions in the motor to cause the vapor after it reaches the saturated condition to be maintained in such condition during a predetermined amount of expansion.

87. A vapor motor comprising an element movable by the action of the vapor, means for admitting vapor to the motor, means for controlling radiation and conduction from and to the vapor working in the motor, means for supplying heat from outside sources to the surface of the said element, and means acting to correlate the volume of vapor admitted to the motor, the speed of the said element, the structural characteristics affecting thermal conditions, and the thermal conditions in the motor to bring the vapor to, and maintain it in, a substantially saturated condition during a material and predetermined period of its passage through the motor.

88. A vapor motor comprising an element movable by the action of the vapor, means for causing the admission of superheated vapor to the motor, means for controlling radiation and conduction from and to the vapor working in the motor, means for supplying heat from outside sources to the surfaces of the said element, and means acting to correlate the volume and quality of vapor admitted to the motor, the structural characteristics affecting thermal conditions, the other thermal conditions, and the speed of said element to cause the vapor after it reaches the saturated condition to be maintained in such condition during a predetermined amount of expansion.

89. A vapor motor comprising an element movable by the action of the vapor, means for admitting vapor to the motor, means for controlling radiation and conduction from and to the vapor working in the motor, means for supplying heat from outside sources to the surfaces of the said element, and means acting to correlate the volume of vapor admitted to the motor, the resistance to the movement of said element, the structural characteristics affecting thermal conditions, and the thermal conditions in the motor to regulate the amount of heat abstracted from the working vapor.

90. A vapor engine comprising a cylinder, a piston reciprocable therein, means for admitting vapor to the cylinder, means for supplying heat from outside sources independently of the working vapor to the working vapor, and means acting to correlate the volume of vapor admitted to the cylinder the volume of clearance space, the other structural characteristics affecting thermal conditions, the thermal conditions in the cylinder, and the piston speed to insure that the vapor in the cylinder shall be in a substantially saturated condition at the end of the expansion.

91. A vapor engine comprising a cylinder, a piston reciprocable therein, means for causing vapor to be supplied to the cylinder, means for supplying heat to some of the interior surfaces through the walls, and means acting to maintain the thermal conditions of a character to insure that the vapor at the end of the expansion shall be in not less than a substantially saturated condition.

92. A vapor engine comprising a cylinder, a piston reciprocable therein, means for admitting vapor to the cylinder, means for supplying heat from outside sources independently of the working vapor to the working vapor, and means acting to correlate the volume of vapor admitted to the cylinder, the structural characteristics affecting thermal conditions, the thermal conditions, and the resistance to the movement of the piston to maintain the thermal conditions of a character to insure that the vapor at the end of the expansion shall be in a substantially saturated condition.

93. A vapor engine comprising a cylinder, a hollow piston reciprocable therein provided with face walls of a material having a materially greater degree of heat transmissibility than iron, means for admitting vapor to the cylinder, means for supplying heat to the interior of the piston, means for supplying heat through the walls to other surfaces in contact with the working vapor, and means acting to correlate the volume of vapor admitted to the cylinder, the speed of the piston, the amount of heat so supplied to the piston and other surfaces, the other structural characteristics affecting thermal conditions, and the other thermal conditions to insure that the vapor in the cylinder shall be in a substantially saturated condition at the end of the expansion.

94. A vapor engine comprising a cylinder, a hollow piston reciprocable therein provided with face walls of a material having a materially greater degree of heat transmissibility than iron, means for admitting vapor to the cylinder, means for supplying heat to the interior of the piston, means for supplying heat through the walls to other surfaces in contact with the working vapor, and means acting to correlate the volume of vapor admitted to the cylinder, the speed of the piston, the amount of heat so supplied to the piston and other surfaces, the other structural characteristics affecting thermal conditions, and the other thermal conditions to insure that the vapor in the cylinder shall follow the saturated curve to the end of the expansion whenever after cut off it reaches a saturated condition.

95. A vapor engine comprising a cylinder provided with jacketed end and side walls, a hollow piston reciprocable therein and provided with face walls of a material having a materially greater degree of heat transmissibility than iron, means for admitting vapor to the cylinder, connections through the cylinder to the interior of the piston, means for supplying vapor to said jacket and through said connections to the piston to raise the interior walls of the cylinder to not less than substantially the initial temperature of the working vapor, and means acting to correlate the volume of vapor admitted to the cylinder, the speed of the piston, the said and other structural characteristics affecting thermal conditions, and the said and other thermal conditions to maintain all the interior surfaces at a temperature sufficient to insure that the said surfaces shall be dry at the end of the expansion.

96. A vapor engine comprising a cylinder, a hollow piston reciprocable therein having the absorbing and transmitting faces thereof shaped materially to increase their area over that presented by plain surfaces, means for admitting vapor to the cylinder, means for supplying heat to the interior of the piston, and means acting to correlate the volume of vapor admitted to the cylinder, the speed of the piston, the amount of heat supplied to the piston, the other thermal conditions, and the structural characteristics affecting thermal conditions to insure that the piston faces shall be dry at the end of the expansion.

97. A vapor engine comprising a cylinder, a piston reciprocable therein, means for admitting vapor to the cylinder, means for supplying heat from outside sources through the walls to the surfaces adjacent the exhaust which are exposed to the high temperature of the freshly admitted vapor, means for increasing the area of the said surfaces abstracting heat from outside sources, and means acting to correlate the volume of vapor admitted to the cylinder, the speed of the piston, the mount of heat so supplied, the other thermal conditions, the said and other structural characteristics affecting thermal conditions to insure that the vapor shall be in a saturated condition at the end of the expansion.

98. A vapor engine comprising a cylinder, a piston reciprocable therein, means for admitting vapor to the cylinder, means for supplying heat from outside sources through the walls to the surfaces adjacent the exhaust which are exposed to the high temperature of the freshly admitted vapor, means for increasing the area of the outer surfaces abstracting heat from outside sources and for decreasing the heat transmissibility of the inner surfaces adjacent the exhaust, and means acting to correlate the volume of vapor admitted to the cylinder, the speed of the piston, the amount of heat so supplied, the other thermal conditions, the said and other structural characteristics affecting thermal conditions to insure that the vapor shall be in a saturated condition at the end of the expansion.

99. A vapor engine comprising a cylinder, a piston reciprocable therein, means for admitting vapor to the cylinder, means for decreasing the heat transmissibility of the inner surfaces adjacent the exhaust, and means acting to correlate the volume of vapor admitted to the cylinder, the speed of the piston, the thermal conditions, and the said and other structural characteristics affecting thermal conditions to insure that the vapor shall be in a saturated condition at the end of the expansion.

100. A vapor engine comprising a cylinder, a piston reciprocable therein, means for admitting vapor to the cylinder, an exhaust passage, an exhaust valve reciprocable therein, a jacket for the portion of the cylinder containing said passage, means for supplying heat to said jacket, means for reciprocating said valve to cause that portion of the valve exposed to the freshly admitted vapor when the valve is closed to be brought into contact with the jacketed surface when the valve is open and thus heated, means for supplying heat from outside sources other than the working vapor to some of the interior surfaces of the cylinder, and means acting to correlate the speed of the piston, the volume of vapor admitted to the cylinder, the heat so supplied, the other thermal conditions, and the said and other structural characteristics affecting thermal conditions to cause the vapor at the end of the expansion to be in a substantially saturated condition.

101. A vapor engine comprising a cylinder, a piston reciprocable therein, means for admitting vapor to the cylinder, an exhaust passage, an exhaust valve having the surface in contact with the freshly admitted vapor substantially equal to the area of the exhaust passage, a jacket for the portion of the cylinder containing said passage, means for supplying heat to said jacket, means for operating said valve to cause that portion of the valve exposed to the freshly admitted vapor when the valve is closed to be brought into contact with the jacketed surface when the valve is open and thus heated, means for supplying heat from outside sources other than the working vapor to some of the interior surfaces of the cylinder, and means acting to correlate the speed of the piston, the volume of vapor admitted to the cylinder, the heat so supplied, the other thermal conditions, and the said and other structural characteristics affecting thermal conditions to cause the vapor at the end of the expansion to be in a substantially saturated condition.

102. A vapor engine comprising a cylinder, a piston reciprocable therein, means for admitting vapor to the cylinder, an exhaust passage, an exhaust valve therefor, means for supplying heat from outside sources other than from or through the freshly admitted vapor to the surfaces of the exhaust valve, the exhaust passage, and the surfaces adjacent thereto which are exposed to the high temperature of the freshly admitted vapor, means for retarding the conduction of heat from the surfaces of the exhaust valve exposed to the freshly admitted vapor, means for supplying heat from outside sources other than the working vapor to some of the interior surfaces of the cylinder, and means acting to correlate the volume of vapor admitted to the cylinder; the speed of the piston, the heat so supplied, the other thermal conditions, and the said and other structural characteristics affecting thermal conditions to cause the vapor at the end of the expansion to be in a substantially saturated condition.

103. A vapor engine comprising a cylinder, a piston reciprocable therein, means for admitting vapor to the cylinder, a jacketed steam chest, admission ports opening from the steam chest into the cylinder, means adjacent said ports to prevent any moisture in the steam chest from running into the cylinder, means for automatically draining any such moisture from the steam chest, means for supplying heat from outside sources through the walls to some of the interior surfaces of the cylinder, and means acting to correlate the volume of vapor admitted to the cylinder, the speed of the piston, the heat so supplied, the other thermal conditions and the said and other structural characteristics affecting thermal conditions to cause the vapor at the end of the expansion to be in a substantially saturated condition.

104. A vapor motor comprising a jacketed movable element adiabatically acted upon by the vapor and having that wall, the surface of which is so adiabatically acted upon, of a material having a materially greater degree of heat transmissibility than iron, means for admitting vapor to the motor, means for controlling radiation and conduction from and to the vapor working in the motor, means for supplying vapor to the said jacket, and means acting to correlate the volume of vapor admitted to the motor, the speed of the said element, the thermal conditions in the motor, and the structural characteristics affecting thermal conditions to bring the vapor to, and maintain it in, a substantially saturated condition during a material and predetermined period of its passage through the motor.

105. A vapor motor comprising a jacketed movable element adiabatically acted upon by the vapor and having the area materially increased of the heat absorbing surface of that wall, the surface of which is so adiabatically acted upon, means for admitting vapor to the motor, means for controlling radiation and conduction from and to the vapor working in the motor, means for supplying vapor to the said jacket, and means acting to correlate the volume of vapor admitted to the motor, the speed of the said element, the thermal conditions in the motor, and the structural characteristics affecting thermal conditions to bring the vapor to, and maintain it in a substantially saturated condition during a material and predetermined period of its passage through the motor.

106. The method of obtaining work from a vapor motor which consists in admitting to the motor vapor of such volume and quality as to be reduced below a saturated condition by work performance in its passage through the motor, in supplying heat from outside sources independently of the working vapor to some of the surfaces in contact with the working vapor in order to control radiation and conduction of heat from and to the vapor working in the motor, and in correlating the volume of vapor admitted to the motor, the speed of the movable element acted upon by the vapor, the structural characteristics affecting thermal conditions, and the thermal conditions in the motor, to insure that the vapor shall be in not less than a substantially saturated condition at the end of the expansion under normal running conditions of the motor.

107. The method of obtaining work from a vapor motor which consists in admitting to the motor vapor of such volume and quality as to be reduced below a saturated condition by work performance in its passage through the motor, in supplying heat from outside sources independently of the working vapor to some of the surfaces in contact with the working vapor in order to control radiation and conduction of heat from and to the working vapor, in automatically maintaining the exterior surfaces in condition freely to abstract said heat from the heating agent, and in correlating the volume of vapor admitted to the motor, the speed of the movable element acted upon by the vapor, the structural characteristics affecting thermal conditions, and the thermal conditions in the motor, to insure that the vapor shall be in not less than a substantially saturated condition at the end of the expansion under normal running conditions of the motor.

108. A vapor motor comprising an element movable by the action of the vapor, means for causing the admission to the motor of vapor of such volume and quality as to be reduced below a saturated condition by work performance in its passage through the motor, means for supplying heat from outside sources independently of the working vapor to some of the surfaces in contact with the working vapor in order to control radiation and conduction of heat from and to the vapor working in the motor, and, means acting to correlate the volume of vapor admitted to the motor, the speed of the movable element acted upon by the vapor, the structural characteristics affecting thermal conditions, and the thermal conditions in the motor, to insure that the vapor shall be in not less than a substantially saturated condition at the end of the expansion under normal running conditions of the motor.

109. A vapor motor comprising an element movable by the action of the vapor, means for causing the admission to the motor of vapor of such volume and quality as to be reduced below a saturated condition by work performance in its passage through the motor, means for supplying heat from outside sources independently of the working vapor to some of the surfaces in contact with the working vapor in order to control radiation and conduction of heat from and to the working vapor, means for automatically maintaining the exterior surfaces in condition freely to abstract said heat from the heating agent, and means acting to correlate the volume of vapor admitted to the motor, the speed of the movable element acted upon by the vapor, the structural characteristics affecting thermal conditions, and the thermal conditions in the motor, to insure that the vapor shall be in not less than a substantially saturated condition at the end of the expansion under normal running conditions of the motor.

110. The method of obtaining work from a vapor motor which consists in admitting to the motor vapor of such volume and quality as to be reduced below a saturated condition by work performance in its passage through the motor, in supplying heat from outside sources independently of the working vapor to some of the surfaces in contact with the working vapor in order to control radiation and conduction of heat from and to the vapor working in the motor, and in correlating the volume of vapor admitted to the motor, the speed of the movable element acted upon by the vapor, the structural characteristics affecting thermal conditions, and the thermal conditions in the motor, to insure that during normal operation of the motor the vapor shall not contain substantially more moisture at the end of the expansion than that due to cooling of the vapor by the work performed by it during its passage through the motor plus any moisture carried in with the vapor; whereby cumulative losses are prevented.

111. The method of obtaining work from a vapor engine comprising a cylinder with a piston reciprocable therein, which consists in admitting to the cylinder vapor of such volume and quality as to be reduced below a saturated condition by work performance in its passage through the cylinder, in supplying heat from outside sources through the piston wall to the face thereof, in supplying heat from outside sources independently of the working vapor to other surfaces in contact with the working vapor in order to control radiation and conduction of heat from and to the working vapor, and in correlating the volume of vapor admitted to the cylinder, the structural characteristics affecting thermal conditions, the thermal conditions, and the piston speed to insure that during normal operation of the engine the vapor shall not contain substantially more moisture at the end of the expansion than that due to cooling of the vapor by the work performed by it during the stroke plus any moisture carried in with the vapor, whereby cumulative losses are prevented.

112. The method of obtaining work from a vapor engine comprising a cylinder with a piston reciprocable therein which consists in admitting to the cylinder vapor of such volume and quality as to be reduced below a saturated condition by work performance in its passage through the cylinder, in supplying heat from outside sources independently of the working vapor to the working vapor, in order to control radiation and conduction of heat from and to the working vapor, in exhausting the main body of the vapor at alternate strokes through separate ports at opposite sides of the center of the cylinder during normal operation of the engine, and in correlating the volume of vapor admitted to the cylinder, the structural characteristics affecting thermal conditions, the thermal conditions, and the piston speed to insure that during normal operation of the engine the vapor shall not contain substantially more moisture at the end of the expansion than that due to cooling of the vapor by the work performed by it during the stroke plus any moisture carried in with the vapor, whereby cumulative losses are prevented.

113. A vapor motor comprising an element movable by the action of the vapor, means for causing the admission to the motor of vapor of such volume and quality as to be reduced below a saturated condition by work performance in its passage through the motor, means for supplying heat from outside sources independently of the working vapor to some of the surfaces in contact with the working vapor in order to control radiation and conduction of heat from and to the vapor working in the motor, and means acting to correlate the volume of vapor admitted to the motor, the speed of the movable element acted upon by the vapor, the structural characteristics affecting thermal conditions, and the thermal conditions in the motor, to insure that during normal operation of the motor the vapor shall not contain substantially more moisture at the end of the expansion than that due to cooling of the vapor by the work performed by it during its passage through the motor plus any moisture carried in with the vapor; whereby cumulative losses are prevented.

114. A vapor engine comprising a cylinder with a piston reciprocable therein, means for admitting to the cylinder vapor of such volume and quality as to be reduced below a saturated condition by work performance in its passage through the cylinder, means for supplying heat from outside sources through the piston wall to the face thereof, means for supplying heat from outside sources independently of the working vapor to other surfaces in contact with the working vapor in order to control radiation and conduction of heat from and to the working vapor, and means acting to correlate the volume of vapor admitted to the cylinder, the structural characteristics affecting thermal conditions, the thermal conditions, and the piston speed to insure that during normal operation of the engine the vapor shall not contain substantially more moisture at the end of the expansion than that due to cooling of the vapor by the work performed by it during the stroke plus any moisture carried in with the vapor, whereby cumulative losses are prevented.

115. A vapor engine comprising a cylinder with a piston reciprocable therein, means for admitting to the cylinder vapor of such volume and quality as to be reduced below a saturated condition by work performance in its passage through the cylinder, means for supplying heat from outside sources independently of the working vapor to the working vapor in order to control radiation and conduction of heat from and to the working vapor, means for exhausting the main body of the vapor at alternate strokes through separate ports at opposite sides of the center of the cylinder, during normal operation of the engine and means acting to correlate the volume of vapor admitted to the cylinder, the structural characteristics affecting thermal conditions, the thermal conditions, and the piston speed to insure that during normal operation of the engine the vapor shall not contain substantially more moisture at the end of the expansion than that due to cooling of the vapor by the work performed by it during the stroke plus any moisture carried in with the vapor, whereby cumulative losses are prevented.

In testimony whereof, I have signed my name to this specification.

JOSEPH G. PROSSER.